United States Patent Office 3,558,657
Patented Jan. 26, 1971

3,558,657
TETRAOXATRICYCLONONANES, TETRAOXA-
TRICYCLODECANES AND PROCESS FOR
PREPARATION
Herbert E. Johnson, South Charleston, W. Va., assignor to Union Carbide Corporation, a corporation of New York
No Drawing. Filed Oct. 30, 1967, Ser. No. 679,168
Int. Cl. C07d 13/00
U.S. Cl. 260—340.9
5 Claims

ABSTRACT OF THE DISCLOSURE

There is described a process for producing 2,4,6,8-tetraoxatricyclo[3.3.1.0$^{3,7}$]nonanes and 2,4,6,8 - traoxatricyclo[3.3.2.0$^{3,7}$]decanes by reacting 1,2-dicarbonyl compounds with, respectively, 1,3-dicarbonyl compounds or 1,4-dicarbonyl compounds in the presence of an acid catalyst. The process is illustrated by the reaction of glyoxal with either 2,4-pentanedione or 2,5 - hexanedione to form, respectively, 1,5-dimethyl-2,4,6,8 - tetraoxatricyclo[3.3.1.0$^{3,7}$]nonane or 1,5 - dimethyl-2,4,6,8-tetraoxatricyclo[3.3.2.0$^{3,7}$]decane.

The invention relates to a process for producing certain heterotricyclic compounds. In a particular aspect, the invention relates to a process wherein a novel ring closure is effected between a 1,2-dicarbonyl compound and either a 1,3-dicarbonyl compound or a 1,4-dicarbonyl compound. The novel heterotricyclic compounds that are produced by the process of the invention are 2,4,6,8 - tetraoxatricyclo[3.3.1.0$^{3,7}$]nonanes and 2,4,6,8-tetraoxatricyclo[3.3.2.0$^{3,7}$]decanes.

Broadly, the process of the invention comprises reacting (a) a 1,2-dicarbonyl compound with (b) either a 1,3-dicarbonyl compound or a 1,4-dicarbonyl compound to form a tetraoxatricyclo compound. The process is carried out in the presence of an acid catalyst.

For the sake of brevity, a shorthand method can be employed to refer to the novel heterocyclic compounds that are produced by the process. The 2,4,6,8-TetraOxa-TriCyclo[3.3.1.0$^{3,7}$]Nonanes can be referred to as "TOTCYN's," and the 2,4,6,8 - TetraOxaTriCYclo[3.3.2.0$^{3,7}$]Decanes can be referred to as "TOTCYD's."

The process of the invention can be illustrated by the following two reactions:

A.

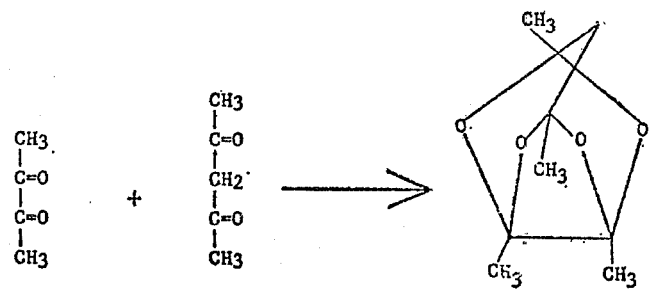

1,3,5,7-tetramethyl-2,4,6,8-tetra-oxatricyclo[3.3.1.0$^{3,7}$]nonane or 1,3,5,7-tetramethyl
TOTCYN

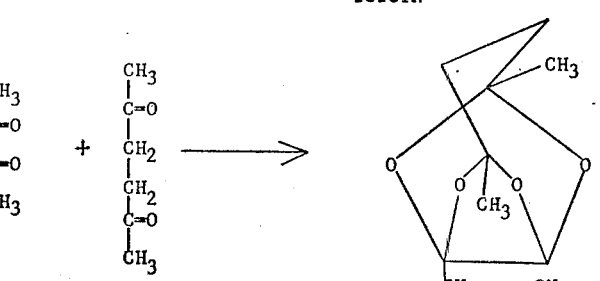

1,3,5,7-tetramethyl-
2,4,6,8-tetraoxatricyclo-
[3.3.2.0$^{3,7}$]decane or 1,3,5,7-tetramethyl
TOTCYD The basic ring structure of the products produced by the process of the invention are the following:

TOTCYN 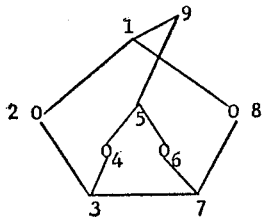

TOTCYD 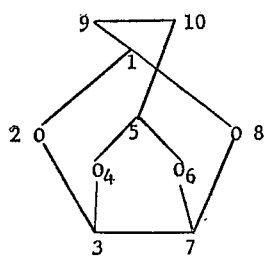

The first reactant that is employed in the process of the invention is a 1,2-dicarbonyl compound that is, a compound that has adjacent or vicinal carbonyl groups. Illustrative 1,2-dicarbonyl compounds include aldehydes having an adjacent aldehyde or ketone group such as glyoxal, pyruvic aldehyde, butane-2-one-1-al, pentane-2-one-1-al, 4-chloro-butane - 2 - one-1-al, 4-bromo-butane-2-one-1-al, 5-cyanopentane-2-one-1-al, 4-methoxybutane-2-one-1-al, 4 - phenoxybutane-2-one-1-al, and the like. Another valuable class of 1,2-dicarbonyl compounds are the diketones such as 2,3-butanedione (also known as "biacetyl"), 2,3-pentanedione, 1-chloro - 2,3 - butanedione, 1,4-dichloro - 2,3 - butanedione, 1-bromo-2,3-butanedione, 1,4-dibromo - 2,3 - butanedione, 1-methoxy-2,3-butanedione, 1,4 - diethoxy-2,3-butanedione, 1-phenyl-2,3-butanedione, 2-methyl-3,4-pentanedione, 3-methyl-4,5-hexanedione, and the like. Preferred 1,2-dicarbonyl compounds include glyoxal, 2,3-butanedione and 1-bromo-2,3-butanedione.

The 1,2-dicarbonyl compounds used in the inventive process can be produced by well known syntheses, of which the following are illustrative:

(a) Oxidation of aldehydes or ketones containing an alpha-methylene group by selenium oxide.

$$RCOCH_2R \xrightarrow{SeO_2} RCOCOR$$

(b) Oxidation of alpha-hydroxy aldehydes or ketones by air with ferric ion catalysis. The alpha-hydroxy ketones are derived from ketones having an alpha-methylene group by chlorination and hydrolysis. The entire sequence of reactions is as follows:

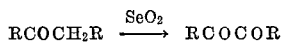
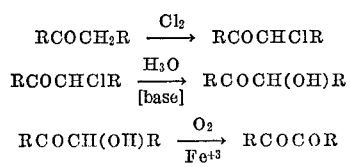

(c) Nitrosation of aldehydes or ketones containing an alphamethylene group followed by hydrolysis of the alpha-diketone monoxime to the alphadiketone. The nitrous acid can be generated in situ by customary procedures such as by passing ethyl nitrite into an acidified solution of the ketone.

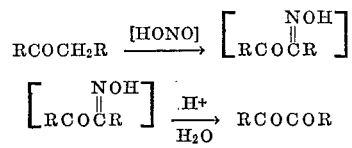

(d) Reaction of oxalyl chloride with cadmium hydrocarbyl.

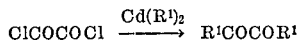

(e) Reaction of alpha-keto acid chlorides with cadmium hydrocarbyl.

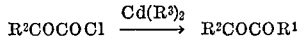

This method is especially useful for preparing unsymmetrical diketones.

(f) The attachment of a limited number of nucleophiles to an alpha-chloro-1,2-dicarbonyl compound.

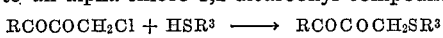

(g) The reaction of silver nitrite with alpha-chloroketones:

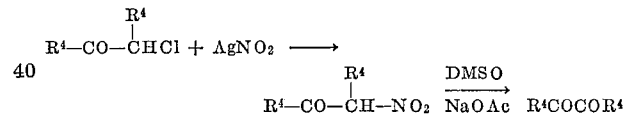

The foregoing methods of syntheses of 1,2-dicarbonyl compounds are merely illustrative of the known methods for producing these compounds. Other methods will be apparent to those having ordinary skill in organic chemistry.

In the foregoing reactions (a) through (g), the several variables can be as follows:

R can be hydrogen, alkyl, cycloalkyl, aryl, aralkyl, alkaryl, and the like.

$R^1$ can be alkyl, alkenyl wherein the unsaturation is at least three carbons away from the point of attachment (i.e., including 3-butenyl but not allyl), aralkyl wherein the aryl group is at least two carbons away from the point of attachment, and the like.

$R^2$ can be alkyl, aryl, cycloalkyl, aralkyl, alkaryl, alkynyl and alkenyl wherein the unsaturation is at least two carbons away from the point of attachment (i.e., including allyl but not vinyl), and the like.

$R^3$ can be hydrogen, alkyl, aryl, alkaryl, aralkyl, alkenyl or alkynyl wherein the unsaturation is at least two carbons away from the point of attachment, cycloalkyl, or the like.

$R^4$ can be alkyl, aryl, aralkyl, alkaryl, cycloalkyl, and the like.

The second reactant is either a 1,3-dicarbonyl compound or a 1,4-dicarbonyl compound. Illustrative 1,3-dicarbonyl compounds include the 1,3-diketones such as 2,4-pentanedione, 2,4-hexanedione, 2,4-octanedione, 1-methoxy-2,4-pentanedione, 2-acetylcyclohexanone, and the like. In addition, many useful derivatives of 1,3-diketones can be employed. Such derivatives include 4-acetyl-5-methyl-2(3H)furanone, which is produced by reacting glyoxal with 2,4-pentanedione at elevated temperature in the presence of an acid catalyst. This compound has the structure:

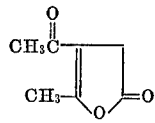

4-acetyl-5-methyl - 2(3H) - furanone reacts with 1,2-dicarbonyl compounds to give the TOTCYN structure (probably by first hydrolyzing to 2,4-pentanedione-3-acetic acid) having a —CH₂COOH group in the 9 position. Another useful class of derivatives are the 3-substituted-2,4-alkanediones such as 3-alkyl-2,4-pentanedione, 3-methyl-2,4-pentanedione,
3-ethyl-2,4-pentanedione,
3-propyl-2,4-pentanedione,
3-butyl-2,4-hexanedione,
3-octyl-2,4-pentanedione,
3-(2-carbomethoxyethyl)-2,4-pentanedione, and the like.

Also useful are:

3-acetyl-N-methyl-4-piperidone,
3-propargyl-2,4-pentanedione,
3-allyl-2,4-pentanedione,
1-phenyl-2,4-pentanedione,
3-(2,4-pentanedion-3-yl)propionic acid methylester, and the like. Preferred 1,3-dicarbonyl compounds include 2,4-pentanedione, 3-allyl-2,4-pentanedione, 3-propargyl - 2,4 - pentanedione, and 4-acetyl-5-methyl-2(3H)-furanone.

The 1,3-dicarbonyl compounds can be prepared by methods that are known in the art. Examples include the following syntheses:

(h) Thermal rearrangement of isopropenyl esters.

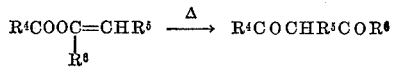

(i) Condensation of esters with ketones or beta-keto esters, catalyzed by base or Lewis acids.

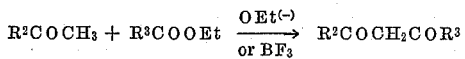

or

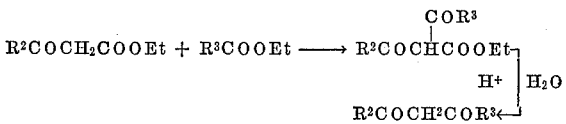

(j) Alkylation of anion of 1,3-diketones with alkyl halides.

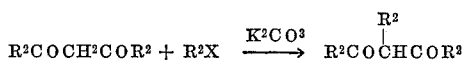

wherein X is I or Br.

(k) Alkylation of dianion of 1,3-diketone with alkyl halide.

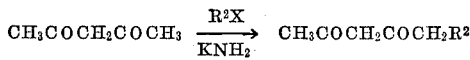

(l) A Michael addition, for example:

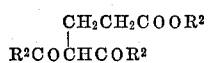

In the foregoing reactions (h) through (l), the variables not heretofore identified are as follows:

R⁵ can be hydrogen, alkyl, aryl, aralkyl, alkaryl, cycloalkyl, it can be joined to R⁶ to form a cycloaliphatic ring, and the like.

R⁶ can be alkyl, aryl, aralkyl, alkaryl, cycloalkyl, it can be joined to R⁵ to form a cycloaliphatic ring, and the like.

The second reactant can also be a 1,4-dicarbonyl compound. Specific illustrative examples include 2,5-hexanedione, 2,5-heptanedione, 2,5-octanedione, and the like.

The 1,4-dicarbonyl compounds can be made by known procedures such as the following:

(m) Hydrolysis of 2,5-disubstituted tetrahydrofuranes

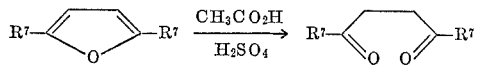

wherein R⁷ can be alkyl, aralkyl, and the like.

(n) Condensation of alpha-chloro carbonyl compound with the sodium salt of a beta-keto ester, for example:

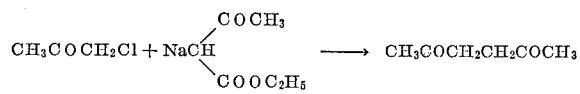

(o) Condensation of alpha-chloro-beta-keto ester with the sodium salt of a beta-keto ester, for example:

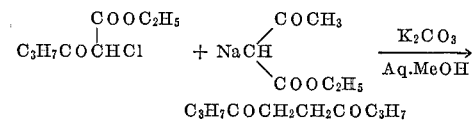

(p) Carbon suboxide plus aldehydes, for example:

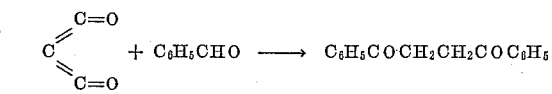

The 1,2-, 1,3- and 1,4-dicarbonyl compounds that are employed in the process of the invention can be represented by the following three formulas:

(I)   R'—CO—CO—R'
(II)  R'—CO—CHR'—CO—R'
(III) R'—CO—CHR'—CHR'—CO—R' wherein each R' individually can be hydrogen or an organic group having at least one carbon atom. The organic group can have up to twenty or more carbon atoms and will preferably have not more than about eight carbon atoms. Illustrative of such organic groups are alkyl, alkenyl, alkynyl, aryl, aralkyl, alkaryl, cycloalkyl, cycloalkenyl, and the like. Also, the organic group can be substituted with functional groups such as oxy, thio, carbonyloxy, halo, and the like, which do not interfere with the reaction.

An acid catalyst is used in the process of the invention. The acid catalyst can be a mineral acid such as sulfuric acid, hydrochloric acid, phosphoric acid, perchloric acid, p-toluenesulfonic acid, chlorosulfonic acid, and the like. The acid catalyst can also be a Lewis acid such as boron trifluoride (usually in the form of BF₃-etherate or the like), titanium tetrachloride, aluminum trichloride, and the like. The acid is employed in catalytically effective amounts such as from about 0.5 to about 50 or more weight percent, preferably from about 2 to 40 weight percent, and more preferably from about 5 to about 35 weight percent, based on weight of reaction mixture. The mineral acids are the preferred catalysts, and hydrochloric acid and sulfuric acid are more preferred.

The process of the invention is carried out by reacting a 1,2-dicarbonyl compound with a 1,3- or 1,4-dicarbonyl compound. The proportion of the reactants is desirably about 1:1 (molar), although other proportions can be used. For example, a molar ratio of 1,2-dicarbonyl comcompound: 1,3- or 1,4-dicarbonyl compound of from about 1:10 to 10:1 can be used, and preferably, from about 1:3 to about 3:1. A molar ratio of about 1:1 (e.g., from about 1.5:1 to 1:1.5) is more preferred.

The reaction temperature can vary over a fairly wide range, for instance, from about −35° C. to about +80° C., preferably from about −5° C. to about +30° C. Of course, the particular temperature selected will vary with the reactants. Where side reactions are possible, these begin to become significant above about +30° C.

The reaction time can vary over a wide range, depending upon the nature of the reactants' presence or absence of diluent, and the reaction temperature. The reaction is carried out for a period of time sufficient to produce the desired TOTCYN or TOTCYD product, which will usually be from about 8 hours to 100 days or more. Reaction times of from about 2 to 75 days are more usual.

Atmospheric pressure is preferred for convenience, although the process of the invention can be carried out at other pressures if desired.

The reaction can be carried out with or without an inert liquid reaction medium. In some cases, the use of a liquid reaction medium is preferred.

Among the liquids that can be used as the reaction medium are water, ethanol, isopropyl alcohol, methanol, diisopropyl ether, diethyl ether, dioxane, tetrahydrofuran, acetic acid, and the like. The amount of reaction medium is not critical, and can constitute up to about 95 weight percent of the reaction mixture.

The reaction equipment can be conventional reaction vessels. The only special requirement is that the equipment should be moderately corrosion resistant since an acid catalyst is used in the reaction.

The product can be recovered by standard procedures. Often the TOTCYN or TOTCYD product will precipitate from the reaction mixture, and it can therefore be recovered by filtration and purified by chromatography and recrystallization, as is illustrated in the examples. In other cases, unreacted starting reactants and solvent can be removed from the product by distillation. Of course, the acid catalyst is normally neutralized.

The TOTCYN and TOTCYD ring structures have been found to be quite stable. For this reason, many TOTCYN and TOTCYD derivatives can be prepared by well known synthetic techniques without destruction of the basic ring structures. Referring now to the TOTCYN structure:

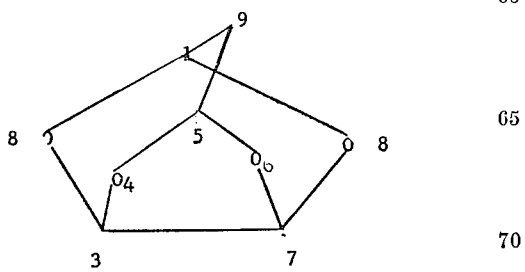

functional groups are most readily inserted at the 3, the 7 and the 9 positions. This has led to the use of a simple triangular symbol to represent the TOTCYN ring structure of those TOTCYN's that are prepared from 2,4-pentanedione or 3-substituted derivatives thereof. In this symbol, only the 3, 7 and 9 positions are shown, with the methyl substituents at the 1 and 5 positions being assumed. This symbol is the following:

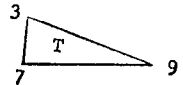

A few illustrations will suffice to clarify the use of the triangular symbol. The TOTYCIN prepared from 2,3-butanedione and 2,4-pentanedione:

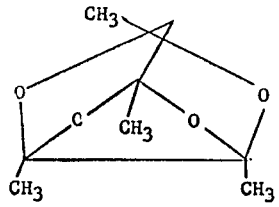

is represented by the triangular symbol:

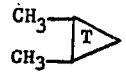

The TOTCYN prepared from glyoxal and 3-allyl-2,4-pentanedione:

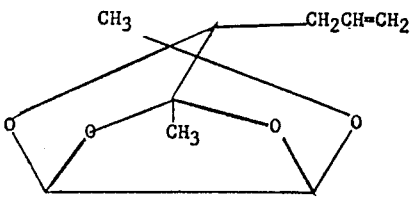

is represented by the triangular symbol:

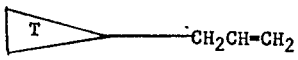

(A) The TOTCYN's can be chlorinated by known procedures such as by reaction with chlorine in the presence of benzoyl peroxide in carbon tetrachloride solvent. For instance, the following reactions have been carried out:

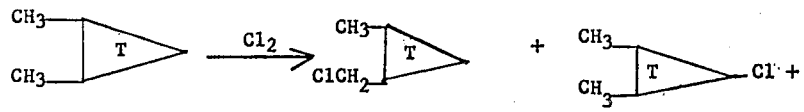

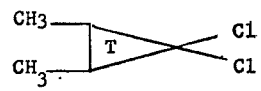

plus other chlorinated products. The chlorinated products can in most cases be separated by fractional distillation under vacuum, or by other separation techniques.

(B) TOTCYN's having an allyl group at the 9 position can be readily employed to produce derivatives by known reactions:

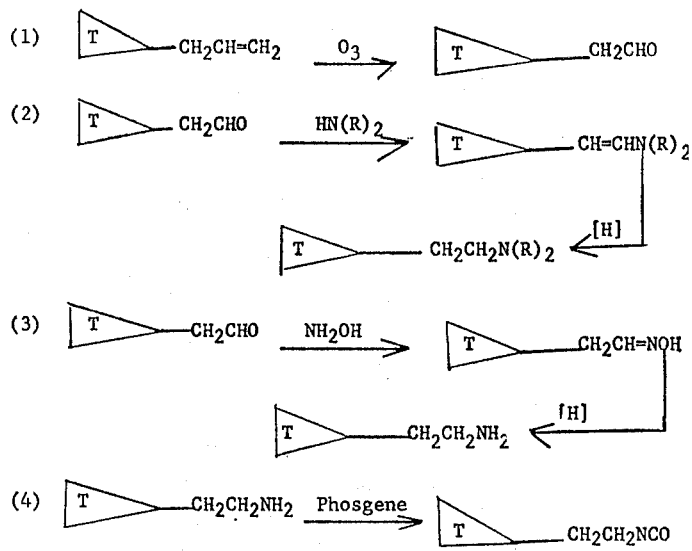

The isocyanate can be reacted with active hydrogen-containing compounds such as alcohols, mercaptans, amines, carboxylic acids, and the like to produce carbamates, thiocarbamates, substituted ureas, and the like.

Additional derivatives that can be produced from the amine include the following:

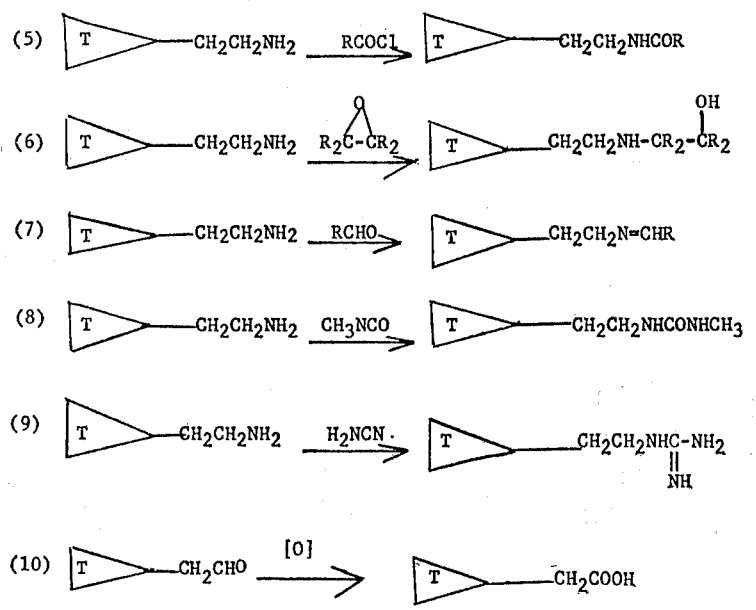

Most reactants that normally react with carboxylic acids can be reacted with TOTCYN carboxylic acids. Examples include primary and secondary amines, alcohols, mercaptans, epoxides, isocyanates, and the like.

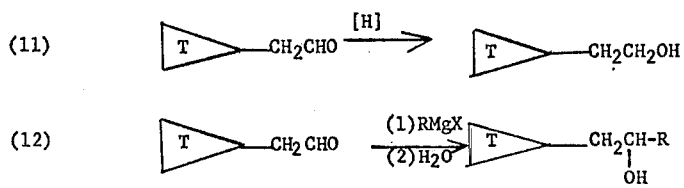

The alcohols can be reacted with acids, isocyanates, isothiocyanates, acyl chlorides, epoxides, and the like to produce the usual reaction products.

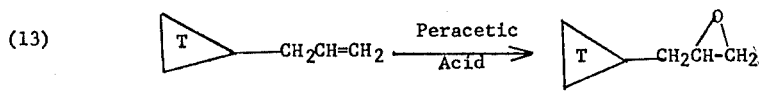

The epoxide can be reacted with a wide variety of active hydrogen-containing compounds and other reactants to give the customary reaction products. Examples of such reactants include primary and secondary amines, hydrazines, alcohols, mercaptans, carboxylic acids and anhydrides, and the like.

(C) The 9-allyl TOTCYN can be isomerized to the 9-propenyl TOTCYN which can be used as the starting reactant in the preparation of many useful derivatives.

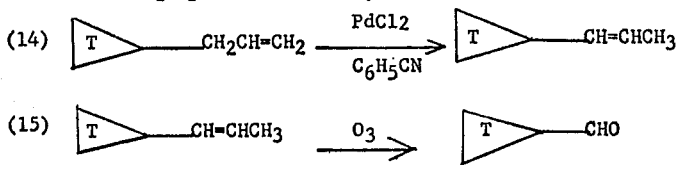

TOTCYN-9-carboxaldehydes undergo most of the usual aldehyde reactions such as those exemplified above in Paragraph (B). Some reactions, such as the reaction of the aldehyde with a secondary amine to form an enamine, which require the formation of a double bond at the 9 position often do not proceed readily with 1,5-disubstituted TOTCYN's, probably because of steric factors. However, the aldehyde can be oxidized to an acid, reduced to an alcohol, it can be reacted with a Grignard reagent and then water to form a secondary alcohol, it can be reacted with hydroxylamine to form an oxime, and the like. The resulting acids, alcohols, oximes and their derivatives can then be reacted with reactants such as those exemplified above in Paragraph (B). Some dditional illustrative reactions involving the oxime derived from the aldehyde shown in reaction (15) include the following:

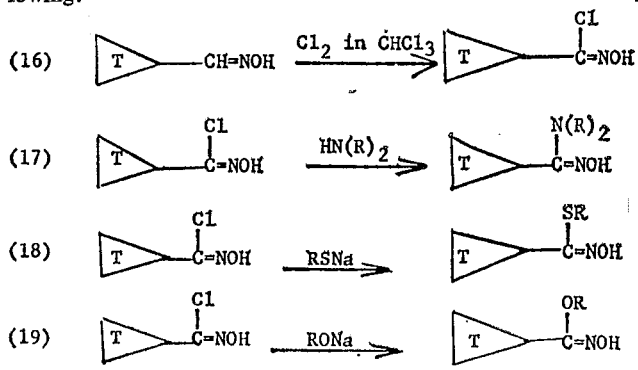

(D) The 9-propargyl TOTCYN's are very useful material as starting reactants for preparing derivatives. These TOTCYN's are prepared by reacting a 1,2-dicarbonyl compound with 3-propargyl-2,4-pentanedione. This latter material is prepared by reacting propargyl bromide with excess 2,4-pentanedione in the presence of a base such as sodium carbonate.

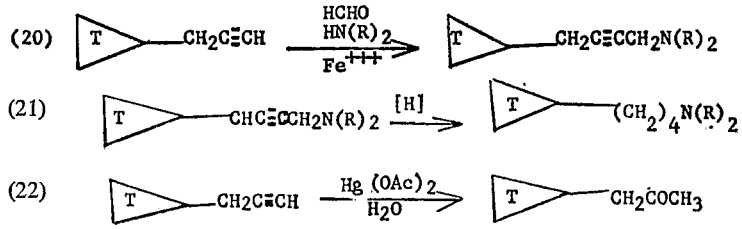

(E) Halogenated TOTCYN's can be very useful in preparing derivatives.

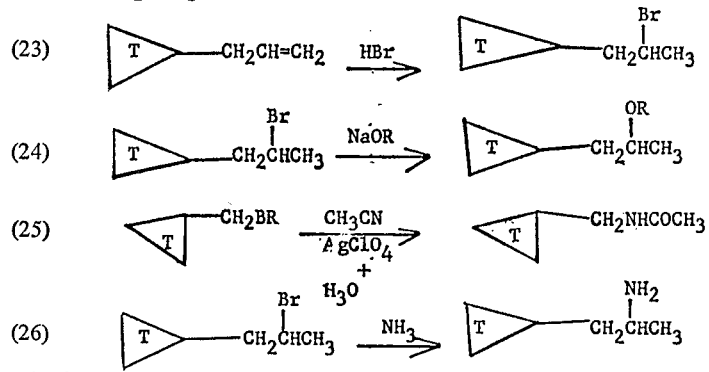

The foregoing reactions have used the TOTCYN's for illustrations. Similar reactions can be carried out using analogous TOTCYD's.

From the foregoing discussion, it is seen that a very large number of new compounds are provided by the invention. These new compounds are either 2,4,6,8-tetraoxatricyclo[3.3.1.0$^{3,7}$]-nonanes, i.e., TOTCYN's, or 2,4,6,8-tetraoxatricyclo[3.3.2.0$^{3,7}$]-decanes, i.e., TOTCYD's. The TOTCYN's can have substituent groups at one or more of the 1, 3, 5, 7 and 9 positions. The TOTCYD's can have substituent groups at one or more of the 1, 3, 5, 7, 9 and 10 positions. Among such substituent groups that can be present are alkyl such as methyl, ethyl, propyl, butyl, pentyl, hexyl, octyl, decyl, lauryl, stearyl, eicosyl, and the like— cycloalkyl such as cyclopentyl, cyclohexyl, bicyclo-[2.2.1]heptyl, cyclobutyl, cycloheptyl, cyclooctyl, and the like; alkenyl such as vinyl, allyl, 1-propenyl, butenyl, pentenyl, hexenyl, octenyl, decenyl, oleyl, linoleyl, linolenyl, and the like; cycloalkenyl such as cyclopentenyl, cyclohexenyl, bicyclo[2.2.1]heptenyl, and the like; aryl, alkaryl, and aralkyl groups such as phenyl, benzyl, tolyl, xylyl, 2-phenylethyl, and the like; heterocyclic groups such as pyridyl, morpholinyl, piperidinyl, pyrrolyl, pyrazolyl, furanyl, furfuryl, thienyl, thiazolyl, 1,2,4-oxadiazolyl, and the like. Also, two of the substituent groups can be joined together to form a cyclic group which can contain one or more hetero atoms. The above exemplified substituent groups can be substituted with functional groups. Such functional groups include oxy, thio, hydroxy, mercapto, carbonyl, halo, amino including N- and N,N-substituted amino, cyano, isonitroso, isocyanato, isothiocyanato, nitro, nitroso, thiocarbonyl, sulfinyl, sulfonyl, sulfonamido, azido, diazo, ureido, ureylene, carbamoyl, oxycarbonylamino, thiophosphoryl, phosphoryl, phosphato, phosphito, sulfato, sulfito, vicinal epoxy, vicinal epithio, carbonyloxy, oxycarbonyloxy, carboxy, formyl, hydroxamino, guanido, guanyl, hydrazino, hydrazo, imino, iso cyano, cyanato, azoxy, sulfoamino, sulfamoyl, thioureido, thiocarbamoyl, thiocarbonylamino, and the like. Also, many of the above exemplified functional groups can be bonded directly to the TOTCYN or TOTCYD nucleus.

Specific illustrative TOTCYN's that are provided by the invention include the following compounds:

1,5-dimethyl-2,4,6,8-tetraoxatricyclo[3.3.1.0$^{3,7}$]nonane, i.e.,
1,5-dimethyl-TOTCYN,
1,3,5-trimethyl-TOTCYN,
1,3,5,7-tetramethyl-TOTCYN,
1,3,5,7,9-pentamethyl-TOTCYN,
1,3,5,7-tetramethyl-9-ethyl-TOTCYN,
1,3,5,7-tetramethyl-9-propyl-TOTCYN,
1,3,5,7-tetramethyl-9-butyl-TOTCYN,
1,3,5,7-tetramethyl-9-(2-ethylhexyl)-TOTCYN,
1,3,5,7-tetramethyl-9-decyl-TOTCYN,
1,3,5,7-tetramethyl-9-lauryl-TOTCYN,
1,3,5,7-tetramethyl-9-stearyl-TOTCYN,
1,3,5,7-tetramethyl-9-allyl-TOTCYN,
1,3,5-trimethyl-9-allyl-TOTCYN,
1,5-dimethyl-9-allyl-TOTCYN,
1,3,5,7-tetramethyl-9-(1-propenyl)-TOTCYN,
1,5-dimethyl-9-(2-butenyl)-TOTCYN,
1,3,5,7-tetramethyl-9-oleyl-TOTCYN,
1,3,5,7-tetramethyl-9-linolenyl-TOTCYN,
1,3,5-trimethyl-7-cyclohexyl-TOTCYN,
1,5-dimethyl-9-propargyl-TOTCYN,
1,3,5-trimethyl-9-propargyl-TOTCYN,
1,3,5,7-tetramethyl-9-propargyl-TOTCYN,
1,5-dimethyl-3-phenyl-TOTCYN,
1,5-dimethyl-3-benzyl-TOTCYN,
3,5,7-trimethyl-1,9-butano-TOTCYN,
1,3,7-trimethyl-5-ethyl-TOTCYN,
1,3,5-trimethyl-5-butyl-TOTCYN,
1,3,5,7-tetramethyl-9-chloro-TOTCYN,
1,3,5,7-tetramethyl-9,9-dichloro-TOTCYN,
1,3,5-trimethyl-7-chloromethyl-TOTCYN,
1,3,5-trimethyl-7-bromomethyl-TOTCYN,
1,3,5,7-tetramethyl-9-(1-bromoallyl)-TOTCYN,
1,3,5,7-tetramethyl-9-(3-bromo-1-propenyl)-TOTCYN,
1,3,5,7-tetramethyl-9-(2,3-dibromopropyl)-TOTCYN,
1,5-dimethyl-3,7-di(bromomethyl)-TOTCYN,
1,3,5-trimethyl-7-chloromethyl-9-propargyl-TOTCYN,
1,3,5-trimethyl-7-chloromethyl-9-allyl-TOTCYN,
1,3,5-trimethyl-7-bromomethyl-9-propargyl-TOTCYN,
1,3,5-trimethyl-7-(N-morpholinylmethyl)-TOTCYN,
1,3,5-trimethyl-7-(N-piperidinylmethyl)-TOTCYN,
1,3,5-trimethyl-7-methoxymethyl-TOTCYN,
1,3,5,7-tetramethyl-9-(3-cyclohexyloxy-2-hydroxypropyl)-TOTCYN,
1,3,5-trimethyl-7-benzylthiomethyl-TOTCYN,
1,3,5,7-tetramethyl-9-(2,3-epithiopropyl)-TOTCYN,
1,3,5,7-tetramethyl-9-(2-mercapto-3-butoxy-propyl)-TOTCYN,
1,3,5,7-tetramethyl-TOTCYN-9-ylcarboxaldehyde,
1,3,5,7-tetramethyl-TOTCYN-9-ylcarbonitrile,
2-(1,5-dimethyl-TOTCYN-9-yl)acetaldehyde,
3-(1,5-dimethyl-TOTCYN-9-yl)propionaldehyde,
2-(1,3,5,7-tetramethyl-TOTCYN-9-yl)acetic acid,
2-(1,5-dimethyl-TOTCYN-9-yl)acetic acid isopropyl ester,
1-(1,3,5-trimethyl-TOTCYN-9-yl)propan-2-one,
1,3,5,7-tetramethyl-9-amino-TOTCYN,
1,3,5,7-tetramethyl-9-guanidino-TOTCYN,
3-(1,5-dimethyl-TOTCYN-9-yl)propionamide,
N,N-dimethyl-3-(1,3,5,7-tetramethyl-TOTCYN-9-yl)propionamide,
3-(1,5-dimethyl-TOTCYN-9-yl)propylamide,
N,N-diethyl-4-(1,3,5-trimethyl-TOTCYN-9-yl)butylamine,
4-(1-methoxymethyl-5-methyl-TOTCYN-9-yl)butyronitrile,
3-(1,5-dimethyl-TOTCYN-9-yl)propionaldehyde oxime,
4-(1,5-dimethyl-TOTCYN-9-yl)butyl isocyanate,
2-(1,3,5,7-tetramethyl-TOTCYN-9-yl)ethyl isothiocyanate,
1,3,5-trimethyl-7-(nitrophenyl)-TOTCYN,
1,5-dimethyl-9-allyl-TOTCYN nitrosochloride,
N-[3-(1,3,5-trimethyl-TOTCYN-9-yl)propyl]methyl thiocarbamate,
3-(1,5-dimethyl-TOTCYN-9-yl)propyl methyl sulfoxide,
4-(1,5-dimethyl-3-methoxymethyl-TOTCYN-9-yl)butyl cyclohexyl sulfone,
2-(1,5-dimethyl-TOTCYN-9-yl)ethyl sulfonic acid,
2-(1,3,5,7-tetramethyl-TOTCYN-9-yl)ethyl sulfonamide,
N,N-dimethyl-2-(1,5-dimethyl-TOTCYN-9-yl)acetamide,
1-azido-2-(1,5-dimethyl-TOTCYN-9-yl)ethane,
N-[3-(1,5-dimethyl-TOTCYN-9-yl)ethyl]urea,
N-methyl N-[4-(1,5,7-trimethyl-TOTCYN-9-yl)butyl] urea,
N-[3-(1,3,5-trimethyl-7-methoxymethyl-TOTCYN-9-yl)propyl] N-methyl carbamate,
dimethyl 4-(1,5-dimethyl-3-ethyl-TOTCYN-9-yl)butyl thiophosphate,
disodium 2-(1,3,5,7-tetramethyl-TOTCYN-9-yl)ethyl phosphate,
bis[3-(1,3,5,7-tetramethyl-TOTCYN-9-yl)propyl] sulfate,
9-(1,3-epoxypropyl)-1,5-dimethyl-TOTCYN,
9-(2,3-epoxypropyl)-1,3,5-trimethyl-TOTCYN,
bis[3-(1,5-dimethyl-TOTCYN-9-yl)propyl] carbonate,
N-[2-(1,3,5-trimethyl-TOTCYN-9-yl)ethyl] hydroxylamine,
2-(1,5-dimethyl-3-phenyl-TOTCYN-9-yl)ethyl guanidine,
2-(1,5-dimethyl-TOTCYN-9-yl)acetic acid hydrazide, and the like.

Specific illustrative TOTCYD's include:

1,3,5,7-tetramethyl-2,4,6,8-tetraoxatricyclo[3.3.2.0$^{3,7}$]decane,
1,5-dipropyl-3,7-dimethyl-2,4,6,8-tetraoxatricyclo-[3.3.2.0$^{3,7}$]decane,
1,3,5-trimethyl-7-bromomethyl-2,4,6,8-tetraoxatricyclo-[3.3.2.0$^{3,7}$]decane, and the like.

In the examples which follow, parts are by weight and all temperatures are centigrade, unless otherwise indicated.

The first group of examples, i.e., Examples 1 to 29, illustrate the process of the invention as well as the TOTCYN's and TOTCYD's produced thereby.

EXAMPLE 1

1,3,5-trimethyl-TOTCYN

To a mixture of 840 grams (5.0 moles) of 43% aqueous pyruvic aldehyde and 500 grams (5.0 moles) of 2,4-pentanedione was added 250 ml. of concentrated hydrochloric acid, keeping the temperature at about 5° C. The mixture was allowed to stand at 4° C. (refrigerator) for four days at which time the reaction flask was filled with long spar-like crystals. After collecting the product it was washed well with water and dried to yield 345 grams (40%) of nearly colorless crystals, M.P. 53–54° C. An analytical sample, M.P. 53–54° C., was obtained as long colorless needles after several crystallizations from ethanol.

*Analysis.*—Calc'd for $C_8H_{12}O_4$ (percent): C, 55.80; H, 703. Found (percent): C, 55.94; H, 7.12.

EXAMPLE 2

3-bromomethyl-1,5,7-trimethyl-TOTCYN

A mixture of 30 grams (0.18 mole) of 1-bromo-2,3-butanedione, 20 grams (0.20 mole) of 2,4-pentanedione and 1 ml. of concentrated hydrochloric acid was kept at 4° C. for two days. The resultant crystals, which had formed soon after mixing, were collected, washed well with cold methanol and dried to yield 27 grams (56%) of product as short colorless needles, M.P. 185–186° C. Several crystallizations from methanol afforded an analytical sample, M.P. 189–190° C.

*Analysis.*—Calc'd. for $C_9H_{13}BrO_4$ (percent): C, 40.75; H, 4.91; Br, 30.13. Found (percent): C, 41.35; H, 4.94; Br, 30.14.

EXAMPLE 3

1,5-dimethyl-TOTCYN

A mixture of 2 grams (.0028 mole) of 80% aqueous glyoxal, 2 grams (0.02 mole) of 2,4-pentanedione and 1 ml. of conc. hydrochloric acid was prepared and stored in a refrigerator at 4° for a period of 106 hours. At this time a crystalline precipitate was filtered off and washed with methanol giving 0.6 g. of white needles, M.P. 142–143° C. Two recrystallizations from methanol raised the M.P. of the product to 142.5–143°.

*Analysis.*—Cal'd for $C_7H_{10}O_4$ (percent): C, 53.16; H, 6.37. Found (percent): C, 53.26; H, 6.31.

EXAMPLE 4

2-(1,3,5,7-tetramethyl-TOTCYN-9-yl)acetic acid

A mixture of 15 grams (0.106 ml.) of 4-acetyl-5-methyl-2 (3H)-furanone, 18 grams (0.209 mol) of 2,3-butanedione, 1 ml. of conc. hydrochloric acid and 2 ml. of water was stored in a refrigerator 4° C. for a 4-day period after which 4 grams of crude product, as short, white needles (M.P. 177–179°) were collected by filtration. Two recrystallizations from isopropyl ether gave pure product, M.P. 178–180°.

*Analysis.*—Calc'd for $C_{11}H_{16}O_3$ (percent): C, 54.09; H, 6.60; (mol. wt. 244). Found (percent): C, 54.12; H, 6.12; (mol. wt. 253).

Further storage of the filtrate (at 4° C.) for 3 days gave a solid which was slurried with water, filtered and dried to give 9 g. of tan needles, M.P. 182–183°. Recrystallization from isopropyl ether gave pure material M.P. 183–184°.

EXAMPLE 5

3-(1,3,5,7-tetramethyl-TOTCYN-9-yl)propionic acid methyl ester (A) a mixture of 18.6 grams (0.1 mole) of 3-(2-carbomethoxyethyl)-2,4-pentanedione, 9 grams (0.1 mole) of 2,3-butanedione and 1 ml. of concentrated hydrochloric acid was refrigerated at 0–5° C. for a 17-day period. At this time, the solid product was filtered off and washed with water giving 13 grams of material, M.P. 76–79°. Three recrystallizations raised the M.P. to 83–84°.

*Analysis.*—Calc'd for $C_{13}H_{20}O_6$ (percent): C, 57.34; H, 7.40. Found (percent): C, 57.82; H, 7.43.

(B) The methyl ester was hydrolyzed to produce the acid, M.P. 155–157° C.

EXAMPLE 6

9-allyl-1,3,5,7-tetramethyl-TOTCYN

A mixture of 8.6 grams (0.1 mole) of biacetyl, 14.4 grams (0.1 mole) of 3-allyl-2,4-pentanedione and 1 ml. of concentrated hydrochloric acid was refrigerated for a period of 9 days. At this time, the crystalline product was washed with water and dried to give 5.3 grams of tan crystals, M.P. 48–49°. Two recrystallizations from hexane gave pure material, M.P. 49–50°.

*Analysis.*—Calc'd for $C_{12}H_{18}O_4$ (percent): C, 63.70; H, 8.02. Found (percent): C, 64.03; H, 8.13.

EXAMPLE 7

3-chloromethyl-1,5,7-trimethyl-9-(2-propenyl)-TOTCYN

Three identical experiments were run. Each consisted of storing 1-chlorobiacetyl (12.0 g., 0.1 mole) and 3-(2-propenyl)-2,4-pentanedione (14.4 g., 0.1 mole) in the presence of concentrated hydrochloric acid (1.0 ml.) at 0° for 4–8 weeks. During this time the mixtures were intermittently cooled to −70°, scratched and seeded with minute amounts of 3 - chloromethyl - 1,5,7 - trimethyl TOTCYN and 9 - (2 - propenyl) - 1,3,5,7 - tetramethyl TOTCYN. Eventually, from all three vessels, 3.5 g. (5%) of dark crystals were recovered. Recrystallization gave a colorless solid M.P. 43–47° which had IR and NMR spectra in agreement with the structure.

EXAMPLE 8

9-allyl-1,5-dimethyl-2,4,6,8-tetraoxatricyclo[3.3.1.0$^{3.7}$]-nonane 3-allyl-pentane-2,4-dione (100 g., 0.71 M) was mixed with 40% aqueous glyoxal (145.0 g., 1.0 M). Concentrated hydrochloric acid (50 ml.) was added and the two phase mixture was allowed to stand for 3 weeks at 2° C. At this time the dark two-phase system was treated with a further 25 ml. concentrated hydrochloric acid and subjected to mechanical shaking at −2° C. for two weeks. The mixture was then stored for two more months (total 13 weeks) and worked up by neutralization with sodium bicarbonate and extraction of the organic material with chloroform. The dried extract was distilled and a total of 60.3 grams of 3-allyl-pentanedione was recovered. The crystalline residue was recrystallized from methanol to give 5 g. of colorless crystals. Further recrystallization from methanol gave 2.3 g. (12% yield, based on 3-allyl-2,4-pentanedione consumed) of colorless plates, M.P. 94–96°.

*Analysis.*—Calc'd for $C_{10}H_{14}O_4$ (percent): C, 60.59; H, 7.12. Found (percent): C, 60.29; H, 7.20.

EXAMPLE 9

1,5,7-trimethyl-3-chloromethyl-2,4,6,8-tetraoxatricyclo [3.3.2.0$^{3.7}$]decane

A mixture of 1-chlorobutane-2,3-dione (24.0 g. 0.2 M), 2,5-hexanedione (22.4 g. 0.2 M) and concentrated hydrochloric acid (1 ml.) were kept near 0° for six months. The initially red mixture turned dark and solidified during this time and a few colorless crystals had sublimed out. The mixture was dissolved in benzene and shaken with sodium bicarbonate solution until neutral and was then dried and chromatographed on acid-washed alumina in benzene. A total of 2 liters of eluate was evaporated to give 7.7 g. of an amber oil which was dissolved in ethanol, filtered and seeded. Colorless crystals, 2.3 g. (5%) M.P. 60–63° were obtained. Recrystallization gave the tricyclic ether, M.P. 63–65° C. (Found (percent): C, 50.86; H, 6.62 $C_{10}H_{15}O_4$ Cl requires: C, 51.5; H, 6.44%).

EXAMPLE 10

9-allyl-1,3,5,7-tetramethyl-TOTCYN (A) A mixture of 2,3-butanedione (4.3 g., 0.05 M) 3-allyl-2,4-pentanedione (7.0 g., 0.05 mole) ethanol (10 ml.) and concentrated hydrochloric acid (9 ml.) was kept at 0° for 8 days when crystals had appeared out of the yellow, nearly homogeneous, mixture. After a total of 12 days the pale yellow crystals were collected, washed and dried, 6.6 g., (59%) M.P. 47–50°.

(B) In a similar experiment on a larger scale (2.5 molar) with ethanol (500 ml.) and conc. HCl (450 ml.), after 12 days crude material (380 g., 68%) M.P. 46–49° was collected. Recrystallization from ethanol gave colorless crystals (355 g., 62%) M.P. 47–51°.

(C) 1,3,5,7 - tetramethyl-TOTCYN (Note mole ratio).—2,3-butanedione (86 g., 1.0 mole) was mixed with 2,4-pentanedione (50 g., 0.5 mole) and the solution was added to a solution of sulphuric acid (10 ml.) in water (100 ml.) at 15°. After stirring at room temperature for 4 days the short yellow needles were collected (75 g.). Recrystallization from methanol gave colorless needles (50 g. 48%) M.P. 132–133°.

(D) 1,3,5,7-tetramethyl-TOTCYN.—A mixture of 2,3-butanedione (8.6 g., 0.1 mole) and 2,4-pentanedione (10 g., 0.1 mole) was treated with boron trifluoride etherate (1 ml.) and kept at room temperature. After 24 hours crystals appeared and after 48 hours the crystals were collected and recrystallized from methanol to give colorless needles M.P. 130–133°. The IR spectrum was identical with pure material.

(E) 1,3,5,7-tetramethyl-TOTCYN—A mixture of 2,5-hexanedione (11.6 g., 0.1 mole), 2,3-butanedione (8.6 g., 0.1 mole) and boron trifluoride etherate (1 ml.) were allowed to stand 3 days at room temperature and 4 days at 4°. The crystals (2.1 g.) were collected and recrystallized from methanol to give 1.5 g., (7%) of colorless fine plates, M.P. 103–104°, unchanged by further recrystallization. (Found (percent): C, 59.98; H, 7.86; $C_{10}H_{16}O_4$: req. C, 59.98; H, 8.05%.)

EXAMPLE 11

1,3,5,7-tetramethyl-9-propargyl-TOTCYN 2,3-butanedione was reacted with 3-propargyl-2,4-pentanedione by a procedure analogous to that of the previous examples. The product, having a melting point of 116–117° C., was analyzed as follows:

Calc'd for $C_{12}H_{16}O_4$ (percent): C, 64.27; H, 7.19. Found (percent): C, 64.34; H, 7.13.

EXAMPLE 12

2-(3-bromethyl-1,3,5-trimethyl-TOTCYN-9-yl) acetic acid

By a procedure analogous to that described in Example 4, 4-acetyl-5-methyl-2(3H)-furanone was reacted with 1-bromo-2,3-butanedione using hydrochloric acid as the catalyst. The product had a melting point of 158°–160° C.

EXAMPLE 13

1,3,5,7-tetramethyl-TOTCYD

By a procedure analogous to that described in Example 9, 2,3-butanedione was reacted with 2,5-hexanedione using hydrochloric acid as the catalyst. The TOTCYD product had a melting point of 103.2°–103.8° C., and the following elemental analysis:

Analysis.—Calc'd for $C_{10}H_{16}O_4$ (percent): C, 59.98; H, 8.05. Found (percent): C, 60.07; H, 7.86.

EXAMPLE 14

3,5,7-trimethyl-1,9-butano-TOTCYN

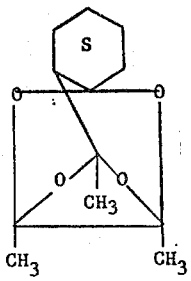

By a procedure analogous to that described in previous examples, 2-acetyl-cyclohexanone was reacted with 2,3-butanedione using hydrochloric acid as the catalyst. The TOTCYN product had a melting point of 129–130° C. and the following elemental analysis:

Analysis.—Calc'd (percent): 63.70; H, 8.02. Found (percent): C, 63.79; H, 8.06.

EXAMPLE 15

3-bromomethyl-5,7-dimethyl-1,9-butano-TOTCYN

By a procedure analogous to that described in previous examples, 2-acetyl-cyclohexanone was reacted with 1-bromo-2,3-butanedione using hydrochloric acid as the catalyst. The TOTCYN product had a melting point of 74–75° C. and the following elemental analysis:

Analysis.—Calc'd (percent): C, 47.21; H, 5.57; Br, 26.23. Found (percent): C, 48.69; H, 5.76; Br, 24.77.

EXAMPLE 16

1,3,5,7,9-pentamethyl-TOTCYN

By a procedure analogous to that described in previous examples, 2,3-butanedione was reacted with 3-methyl-2,4-pentanedione using hydrochloric acid as the catalyst. The TOTCYN product had a melting point of 94° C. and the following elemental analysis:

Analysis.—Calc'd (percent): C, 59.98; H, 8.05. Found (percent): C, 59.69; H, 7.82.

EXAMPLE 17

1,3,5,7-tetramethyl-TOTCYN

By a procedure analogous to that described in previous examples, 2,3-butanedione was reacted with 2,4-pentanedione using hydrochloric acid as the catalyst. The TOTCYN product had a melting point of 135–136° C. and the following elemental analysis:

Analysis.—Calc'd (percent): C, 58.05; H, 7.58. Found (percent): C, 58.69; H, 7.63.

EXAMPLE 18

3-chloromethyl-1,5,7-trimethyl-TOTCYN

By a procedure analogous to that described in previous examples, 1-chloro-2,3-butanedione was reacted with 2,4-pentanedione using hydrochloric acid as the catalyst. The TOTCYN product had a melting point of 183–184° C. and the following elemental analysis:

Analysis.—Calc'd (percent): C, 48.97; H, 5.89; Cl, 16.10. Found (percent): C, 48.56; H, 5.47; Cl, 16.19.

EXAMPLE 19

3,7-di(bromomethyl)-1,5-dimethyl-TOTCYN

By a procedure analogous to that described in previous examples, 1,4-dibromo-2,4-butanedione was reacted with 2,4-pentanedione using hydrochloric acid catalyst. The TOTCYN product had a melting point of 199–199.5° C. and the following elemental analysis:

Analysis.—Calc'd (percent): C, 31.4; H, 3.49. Found (percent): C, 33.67; H, 3.83.

EXAMPLE 20

3-bromoethyl-1,5,7,9-tetramethyl-TOTCYN

By a procedure analogous to that described in previous examples, 1-bromo-2,3-butanedione was reacted with 3-methyl-2,4-pentanedione using hydrochloric acid catalyst. The TOTCYN product had a melting point of 97–99° C. and the following elemental analysis:

Analysis.—Calc'd (percent): C, 43.01; H, 5.38. Found (percent): C, 43.77; H, 5.32.

EXAMPLE 21

9-propargyl-3-chloromethyl-1,5,7-trimethyl-TOTCYN

By a procedure analogous to that described in previous examples, 1-chloro-2,3-butanedione was reacted with 3-propargyl-2,4-pentanedione using hydrochloric acid catalyst. The TOTCYN product had a melting point of 80–81° C. and the following elemental analysis:

*Analysis.*—Calc'd (percent): C, 55.71; H, 5.80. Found (percent): C, 56.99; H, 6.01.

EXAMPLE 22

3-n-butyl-1,5,7-trimethyl-TOTCYN

By a procedure analogous to that described in previous examples, 2,3-heptanedione was reacted with 2,4-pentanedione using hydrochloric acid catalyst. The TOTCYN product had a melting point of 70–71° C. and the following elemental analysis:

*Analysis.*—Calc'd (percent): C, 63.13; H, 8.83. Found (percent): C, 63.40; H, 8.65.

EXAMPLE 23

3-ethyl-1,5,7-trimethyl-TOTCYN

By a procedure analogous to that described in previous examples, 2,3-pentanedione was reacted with 2,4-pentanedione using hydrochloric acid catalyst. The TOTCYN product had a melting point of 162.5–162.8° C. and the following elemental analysis:

*Analysis.*—Calc'd (percent): C, 63.13; H, 8.83. Found (percent): C, 59.99; H, 7.99.

EXAMPLE 24

3-phenyl-1,5,7-trimethyl-TOTCYN

By a procedure analogous to that described in previous examples, 1-phenyl-2,3-butanedione was reacted with 2,4-pentanedione using hydrochloric acid catalyst. The TOTCYN product had a melting point of 77–78° C. and the following elemental analysis:

*Analysis.*—Calc'd percent): C, 67.73; H, 6.50. Found (percent): C, 67.84; H, 6.38.

EXAMPLE 25

9-propargyl-3-bromomethyl-1,5,7-trimethyl-TOTCYN

By a procedure analogous to that described in previous examples, 1-bromo-2,3-butanedione was reacted with 3-propargyl-2,4-pentanedione using hydrochloric acid catalyst. The TOTCYN product had a melting point of 73–74° C. and the following elemental analysis:

*Analysis.*—Calc'd (percent): C, 47.53; H, 4.95; Br. 26.40. Found (percent): C, 48.08; H, 5.05; Br. 29.08.

EXAMPLES 26–29

By procedures analogous to those described above, the following TOTCYN's were produced from the indicated reactants:

(26) 1-methoxymethyl-3,5,7-trimethyl-TOTCYN from 2,3-butanedione and 1-methoxy-2,4-pentanedione; M.P. 54–55° C.

*Analysis.*—Calc'd (percent): C, 55.54; H, 7.46. Found (percent): C, 55.51; H, 7.43.

(27) 1-isobutyl-3,5,7-trimethyl-TOTCYN from 6-methyl-2,4-heptanedione and 2,3-butanedione; M.P. 63–64° C.

*Analysis.*—Calc'd (percent): C, 63.13; H, 8.83. Found (percent): C, 63.23; H, 8.84.

(28) 1-isobutyl-3-bromomethyl-5,7-dimethyl-TOTCYN from 6-methyl-2,4-heptanedione and 1-boron-2,3-butanedione; M.P. 76–77° C.

*Analysis.*—Calc'd (percent): C, 46.88; H, 6.18; Br. 26.04. Found (percent): C, 47.04; H, 6.17; Br. 25.70.

(29) 3,7-di(bromomethyl-1,5-dimethyl-TOTCYN from 1,4-dibromo-2,3-butanedione and 2,4-pentanedione; M.P. 199–200° C.

*Analysis.*—Calc'd (percent): C, 33.52; H, 3.91. Found (percent): C, 34.44; H, 3.79.

The following examples, Nos. 30–32, illustrate the rearrangement of 9-allyl-TOTCYN's to 9-(1-propenyl)-TOTCYN's:

EXAMPLE 30

9-(1-propenyl)-1,3,5,7-tetramethyl-TOTCYN

To a solution of 9-allyl-1,3,5,7-tetramethyl-TOTCYN (Example 6) (2.5 g., .01 mole) in n-heptane (10 ml.), was added 0.025 g. of palladium chloride-dibenzonitrile catalyst, and the mixture slowly heated to 80° with stirring, after which heating was maintained at this temperature for three hours. The mixture was then treated with finely divided charcoal and filtered. On cooling, a crystalline mass (M.P. 105.5–107.5°) formed giving a 60 percent yield (1.1 g.) of the product. Evaporation of the n-hexane gave additional product resulting in a near-quantitative yield. The structure was confirmed by I.R. [loss of vinyl (10.05μ) and appearance of transolefinic (10.27μ) absorption] and n.m.r. (allylic methyl doublet at 1.72 p.p.m. and two olefinic hydrogens at 5.5 p.p.m. from TMS) analyses.

By procedures analogous to that described in Example 30, the following 9-(1-propenyl)-TOTCYN's were prepared from the corresponding 9-allyl-TOTCYN's:

(31) 9-(1-propenyl)-1,5-dimethyl-TOTCYN from the 9-allyl-TOTCYN of Example 8.

(32) 9-(1-propenyl)-3-chloromethyl-1,5,7-trimethyl-TOTCYN from the 9-allyl-TOTCYN of Example 7.

The following examples, Nos. 33–36, illustrates the preparation of epoxides by oxidation of the corresponding olefinically-unsaturated TOTCYN.

EXAMPLE 33

9-(1,2-epoxypropyl)-1,3,5,7-tetramethyl-TOTCYN

A 13.6 g (0.06 mole) portion of 9-(1-propenyl)-1,3,5,7-tetramethyl-TOTCYN (Example 30) was stirred with 75 ml. of an 18.9% solution of peracetic acid in ethyl acetate at room temperature causing immediate solution. The reaction became exothermic after about 30 minutes and stirring was continued, at room temperature, overnight. After evaporation of about 50% of the solvent, the mixture was treated with a large excess of acetaldehyde to destroy any remaining peracid and then evaporated to dryness. Three recrystallizations of the residue from isopropyl ether gave 2.0 g. (13.8% yield) of pure product, M.P. 108.5–110°.

*Analysis.*—Calc'd (percent): for $C_{12}H_{18}O_5$ (percent): C, 59.50; H, 7.50. Found (percent): C, 59.05; H, 7.85.

EXAMPLE 34

9-(2,3-epoxypropyl)-1,3,5,7-tetramethyl-TOTCYN

A 19 percent solution of peracetic acid in ethyl acetate (25 ml. 0.63 mole of peracetic acid) and 9-allyl-1,3,5,7-tetramethyl-TOTCYN (Example 6) (4.5 g, .02 mole) were stirred together for three hours at 60–65°. After cooling, acetaldehyde (20 ml.) was slowly added to destroy the excess peracetic acid. The volatile constituents were removed after one hour of stirring, leaving a white solid (M.P. 100–200°) in quantitative yiled (4.7 g.) whose I.R. (epoxide absorption at 11.98μ) and n.m.r. spectra were in agreement with the expected structure.

*Analysis.*—Calc'd for $C_{12}H_{18}O_5$ (percent): C, 59.5; H, 7.5. Found (percent): C, 60.1; H, 7.6.

EXAMPLE 35

1,5-dimethyl-9-(2,3-epoxypropyl)-2,4,6,8-tetraoxatricyclo[3.3.1.0$^{3.7}$]nonane 1,5 - dimethyl - 9 - allyl - 2,4,6,8 - tetraoxatricyclo [3.3.1.0$^{3.7}$]-nonane (Example 8) (5.0 g., 0.0252 M), dissolved in benzene (65 ml.) was treated with m-chloroperbenzoic acid (85%) (11.2 g., 0.0554 mole) and sodium carbonate (7.1 g.). After the initial exotherm, the mixture was allowed to stand for 7 hours, treated with ether (200 ml.) and 2 N sodium hydroxide. The dried organic layer was evaporated to give 4.4 g. of TOTCYN product (82%): M.P. 105–109°. Recrystallization from isopropanol gave colorless crystals (3.65 g.) M.P. 110–111°. I.R. and n.m.r. spectra were consistent with the assigned structure.

*Analysis.*—Calc'd for $C_{10}H_{14}O_5$ (percent): C, 56.07; H, 6.59. Found (percent): C, 55.97; H, 6.47.

EXAMPLE 36

9-(2,3-epoxypropyl)-3-chloromethyl-1,5,7-trimethyl-TOTCYN

By a procedure analogous to that described in Examples 33 and 34, 9-allyl-3-chloromethyl-1,5,7-trimethyl-TOTCYN (Example 7) was epoxidized. The product had a melting point of 119–120° C. and the following elemental analysis:

Analysis.—Calc'd (percent): C, 52.08; H, 6.19. Found (percent): C, 52.98; H, 6.06.

The following examples, Nos. 37–41, illustrate halogenated TOTCYN's prepared by reacting a TOTCYN with elemental halogen.

EXAMPLE 37

9-(2,3-dibromo)propyl-1,3,5,7-tetramethyl-TOTCYN

Bromine (1.4 g., .0088 mole), as a five percent (weight/weight) solution in carbon tetrachloride (28 g.), was added over a ten-minute period to a stirred solution of 9-allyl-1,3,5,7-tetramethyl-TOTCYN (Example 6) (1 g., .004 mole in carbon tetrachloride (10 ml.)). The bromine color was discharged during the first part of the addition, and the reaction was evaporated after thirty minutes of stirring. The solid residue was recrystallized from methanol giving the expected product (M.P. 158–160°) in a 65 percent yield (1.1 g.). The I.R. spectrum was in agreement with assigned structure.

Analysis.—Calc'd for $C_{12}H_{18}O_4Br_2$ (percent): C, 37.3; H, 4.7. Found (percent): C, 37.6; H, 4.7.

EXAMPLE 38

9-chloro-1,3,5,7-tetramethyl-TOTCYN

A mixture of 93 g. (0.5 mole) of 1,3,5,7-tetramethyl-TOTCYN (Example 17), 250 ml. of carbon tetrachloride and 0.5 g. of benzoyl peroxide was heated at 74°, with stirring, while passing chlorine gas into the mixture for a period of 3 hours and 46 minutes. The reaction mixture was allowed to cool causing separation of 12 g. of solid, M.P. 144–158°. The filtrate was stripped free of low boiling material giving 105 g. of yellow liquid. This material was fractionally distilled under reduced pressure and a cut taken over the range 148–152°/50 mm. which solidified on cooling and weighed 17 g. This solid was recrystallized twice from ethanol to give the white crystalline product, M.P. 88–90°.

Analysis.—Calc'd for $C_9H_{13}ClO_4$ (percent): C, 48.98; H, 5.90. Found (percent): C, 49.00; H, 5.93.

Infrared and n.m.r. spectral studies supported the assigned structure.

EXAMPLE 39

9,9-dichloro-1,3,5,7-tetramethyl-TOTCYN

A mixture of 37.2 g. of 1,3,5,7-tetramethyl-TOTCYN (Example 17), 400 ml. of carbon tetrachloride and 0.2 g. of benzoyl peroxide was heated to reflux (ca. 70°) during which chlorine was passed into the mixture for a period of 104 minutes. At the end of this time, the carbon tetrachloride was stripped from the mixture giving 71 ml. of residue which was fractionated under reduced pressure. The fraction boiling at 85–90°/1 mm. weighed 9 grams and crystallized to give a solid, M.P. 57–61°. Two recrystallizations from ethanol gave the crystalline product, M.P. 79–80°.

Analysis.—Calc'd for $C_9H_{12}Cl_2O_4$ (percent): C, 42.35; H, 4.71; Cl, 27.84. Found (percent): C, 42.23; H, 4.54; Cl, 26.37.

EXAMPLES 40 AND 41

By procedures analogous to that described in Examples 38 and 39, 3-dichloromethyl-1,5,7-trimethyl-TOTCYN and 3,7-bis(dichloromethyl)-1,5-dimethyl-9,9-dichloro-TOTCYN were prepared by chlorinations of 1,3,5,7-tetramethyl-TOTCYN (Example 17). The elemental analyses supported the assigned structures.

The following examples, Nos. 42–56, illustrate the addition of active hydrogen-containing compounds to TOTCYN's containing epoxy groups:

EXAMPLE 42

9-(3-chloro-2-hydroxy)propyl-1,3,5,7-tetramethyl-TOTCYN

A mixture of concentrated HCl (0.8 g., .008 mole), the epoxy compound of Example 34 (2 g., .008 mole) and water (25 ml.) was stirred at 25° for three hours. Insoluble material was removed by filtration and washed with water. The filtrate and water washings were combined, evaporated, and the resulting residue dried. The residue product (0.9 g., 39 percent yield) was a white solid (M.P. 124–125°) whose I.R. and n.m.r. spectra were in agreement with the product.

Analysis.—Calc'd for $C_{12}H_{19}O_5Cl$ (percent): C, 51.7; H, 6.9; Cl, 12.7. Found (percent): C, 52.0; H, 7.1; Cl, 12.5.

EXAMPLE 43

9-(3-methoxy-2-hydroxy)propyl-1,3,5,7-tetramethyl-TOTCYN

Sodium methoxide (9 g., .168 mole), 9-(2,3-epoxypropyl)-1,3,5,7-tetramethyl-TOTCYN (Example 34) (2.3 g., .01 mole) and methanol (50 ml.) were stirred for four hours at 50° under a nitrogen atmosphere. To the cooled mixture, water (5 ml.) was added and the reaction mixture evaporated leaving a solid residue which was extracted with ether. The ether was dried, filtered and evaporated. An oil was obtained which solidified on standing. After recrystallization from n-heptane, the desired product (1.1 g., 41 percent yield) was obtained as a white solid (M.P. 79.5–81.5°). Near-infrared spectral analysis confirmed the structure, showing intramolecular hydrogen-bonded secondary hydroxyl at 2.781μ. The n.m.r. scan was in agreement with the proposed structure.

Analysis.—Calc'd for $C_{13}H_{22}O_6$ (percent): C, 56.9; H, 8.1. Found (percent): C, 57.2; H, 8.0.

EXAMPLE 44

9-(3-butylamino-2-hydroxy)propyl-1,3,5,7-tetramethyl-TOTCYN hydrochloride n-Butylamine (25 ml., .25 mole), the epoxy derivative of Example 34 (2.4 g., .01 mole), and methanol (35 ml.) were stirred together at 60° for two hours. The reaction was cooled and the volatile materials removed leaving a white solid residue which was further dried in a vacuum desiccator. After two recrystallizations from n-heptane, the free base of the product (M.P. 79–81°) was obtained (0.7 g., 23 percent yield). I.R. and n.m.r. spectra confirmed the structure. Evaporation of the n-heptane mother liquor gave an oil which partially solidified on standing. This tacky material was dissolved in ether and ethereal HCl was added causing a solid to precipitate. Washing with ether and recrystallization from isopropanol gave 0.9 g. (26 percent yield) of the product hydrochloride (darkness at 178°, M.P. 183.5–184°) as shown by I.R. and n.m.r.

Analysis.—Calc'd for $C_{16}H_{30}O_5NCl$ (percent): C, 54.6; H, 8.6; N, 4.0; Cl, 10.1. Found (percent): C, 54.7; H, 8.6; N, 4.1; Cl, 10.2.

EXAMPLE 45

9-(3-butoxy-2-hydroxy)propyl-1,3,5,7,tetramethyl-TOTCYN

To a stirred solution at 0.5 g. (0.02 mole) of sodium in 50 ml. of n-butanol was added 4.8 g. (0.2 mole) of 9 - (2,3 - epoxypropyl)-1,3,5,7-tetramethyl-TOTCYN and the resulting solution then stirred at 60° for a 4-hour period. The mixture was then cooled to 25° and, after adding 2 ml. of water, stirred at this temperature for one hour. The reaction solution was filtered, the filtrate evaporated to remove volatiles and the resulting oil taken up in 50 ml. of isopropyl ether. Filtration, drying (MgSO₄) and evaporation of the solution gave 5.0 g. of oily product which solidified on standing. Purification was effected by stirring with 50 ml. of water, collection and drying to give 4.0 g. (63.2% yield) of product, M.P. 52–55°. Recrystallization from various solvents was attempted without success. Both the infrared and n.m.r. spectra were in agreement with the assigned structure.

*Analysis.*—Calc'd for $C_{16}H_{28}O_6$ (percent): C, 60.74; H, 8.92. Found (percent): C, 60.76, H, 8.92.

EXAMPLE 46

9-(2-hydroxy-3-methylamino)propyl-1,3,5,7-tetramethyl-TOTCYN hydrochloride

To a cold (0° C.) solution of 4.8 g. (0.02 mole) of 9-(2,3-epoxypropyl)1,3,5,7-tetramethyl-TOTCYN in 50 ml. of methanol was added, with stirring, a precooled (0° C.) solution (15.5 g., 0.20 mole) of aqueous 40% methylamine. The mixture was stoppered, allowed to warm to room temperature and then stirred at about 25° for 8 hours after which it was evaporated under reduced pressure giving a light yellow gum. The latter was stirred with 300 ml. of dry ethyl ether and the resulting solution filtered free of some insoluble material. Saturated ethereal HCl was added to the filtrate under a dry nitrogen atmosphere until crystallization of the amine hydrochloride was complete. The latter was collected, washed with ether and vacuum dried to give 5.55 g. (90% yield) of crude product. Recrystallization from isopropyl alcohol gave 2.3 g. of pure material, M.P. (dec.) 212°. The infrared spectrum of the product was in agreement with the expected structure.

*Analysis.*—Calc'd for $C_{13}H_{24}ClNO_5$ (percent): C, 50.40; H, 7.81; N, 4.52. Found (percent): C, 50.72; H, 8.04; N, 4.94.

EXAMPLE 47

9-[3-(4-benzylpiperidino)-2-hydroxypropyl]-1,3,5,7-tetramethyl-TOTCYN hydrochloride 4-benzylpiperidine (1 g., .005 mole), the epoxypropyl compound of Example 34 (1 g., .004 mole), and methanol (200 ml.) were stirred for two hours at 60°. The reaction mixture was cooled and solvent removed, leaving an oil which was dissolved in ether. Addition of ethereal HCl to this solution caused precipitation of a gummy material which solidified on standing. The solid was separated by filtration and washed with boiling ethyl acetate. Recrystallization from isopropanol gave the pure product (M.P. 199–201°) as a white solid (0.9 g., 45 percent yield). The I.R. and n.m.r. spectra confirmed the structure.

*Analysis.*—Calc'd for $C_{24}H_{36}O_5NCl$ (percent): C, 63.5; H, 8.0; N, 3.1. Found (percent): C, 63.9; H, 8.2; N, 3.0.

EXAMPLE 48

9-(3-dimethylamino-2-hydroxy)propyl-1,3,5,7-tetramethyl-TOTCYN

A one-liter bomb was charged with a mixture of the 9-epoxypropyl compound of Example 34 (25 g., .1 mole), dimethylamine (150 ml.), and methanol (180 ml.) and then heated to 120° with rocking for three hours. After cooling and venting, the reaction mixture was stripped and additional drying conducted in a vacuum oven (five hours at 60°). A solid slowly crystallized on standing in a vacuum desiccator. Washing with petroleum ether (35–37°) gave the product (M.P. 64.5–66.5°) which was a white solid (18.1 g., 62 percent yield) whose structure was confirmed by I.R. and n.m.r. analyses.

*Analysis.*—Calc'd for $C_{14}H_{25}O_5N$ (percent): C, 58.5; H, 8.8; N, 4.9. Found (percent): C, 58.6; H, 8.8; N, 5.0.

EXAMPLES 49–51

By procedures analogous to those described in Examples 42–48, 9-(2,3-epoxypropyl)-1,3,5,7-tetramethyl-TOTCYN was reacted with the below-indicated compounds to produce the indicated TOTCYN's:

(49) Piperidine to produce 9-[3-piperidino-2-hydroxypropyl]-1,3,5,7-tetramethyl-TOTCYN;

(50) Water (in presence of alkali) to produce 9-(2,3-dihydroxypropyl)-1,3,5,7-tetramethyl-TOTCYN, M.P. 98–100° C.;

(51) Phenyl mercaptan to produce 9-(3-phenylthio-2-hydroxypropyl)-1,3,5,7-tetramethyl-TOTCYN, M.P. 84–86° C.

In each case, the elemental analysis agreed with the assigned structure.

EXAMPLES 52–54

By procedures analogous to those described in Examples 42–48, 9-(2,3-epoxypropyl)-3-chloromethyl-1,5,7-trimethyl-TOTCYN (Example 36) was reacted with the below-indicated compounds to produce the indicated TOTCYN's:

(52) Methanol to produce 9-(3-methoxy-2-hydroxypropyl)-1,5,7-trimethyl-3-chloromethyl-TOTCYN, M.P. 98–100° C.;

(53) Pyrrolidine to produce 9-(3-pyrrolidyl-2-hydroxypropyl)-3-chloromethyl-1,5,7-trimethyl-TOTCYN, M.P. 110–112°C.;

(54) Dimethylamine to produce 9-(3-dimethylamino-2-hydroxypropyl)-3-chloromethyl-1,5,7-trimethyl-TOTCYN, M.P. 89–90° C. Elemental analyses, I.R. spectra and n.m.r. analyses were consistent with the assigned structures of these TOTCYN's.

EXAMPLE 55

The hydrochloride salt of Example 54 was prepared by adding hydrochloric acid, M.P. 230–231° C.

EXAMPLE 56

1,5-dimethyl-9-(3-dimethylamino-2-acetoxypropyl)-2,4,6,8-tetraoxatricyclo[3.3.1.0$^{3,7}$]nonane hydrochloride The parent epoxide (Example 35) (2.5 g.), methanol (50 ml.), and anhydrous dimethylamine (14.8 g.) were charged to a sealed vessel under nitrogen and heated at 75° for 4 hours (80 p.s.i.). The contents of the bomb were evaporated to a yellow oil 3.0 g. (Hydrochloride M.P. 217–218 I.R. 511515). The oil was treated with acetyl chloride (9.4 g.) in acetonitrile (50 ml.) over four hours at room temperature. Evaporation afforded 2.9 g. (74%) of fawn-colored solids, M.P. 224–226°. Recrystallization from ethanol and from methanol gave colorless crystals M.P. 224–226°. Found (percent): C, 49.69; H, 7.19; N, 4.11; $C_{14}H_{24}O_6NCl$. Requires (percent): C, 49.79; H, 7.16; N, 4.15.

EXAMPLE 57

By a procedure analogous to that described in Example 56, 9-(2,3-epoxypropyl)-1,3,5,7-tetramethyl-TOTCYN was first reacted with morpholine, then hydrochloric acid to form the hydrochloride salt, and then acetyl chloride to produce 9-(3-morpholinyl-2-acetoxypropyl)-1,3,5,7-tetramethyl-TOTCYN hydrochloride, M.P. 243–243.5° C. (dec.).

*Analysis.*—Calc'd (percent): C, 53.00; H, 7.41; N, 3.43. Found (percent): C, 52.93; H, 7.53; N, 3.85.

The following examples, Nos. 58–66, were produced by reacting an acid chloride or anhydride with certain of the hydroxyl-containing TOTCYN's of Examples 42–55.

EXAMPLE 58

9-(2-acetoxy-3-butylamino)propyl-1,3,5,7-tetramethyl-TOTCYN hydrochloride

To a stirred, nitrogen-blanketed suspension of 2.1 g. (0.006 mole) of 9-(3-butylamino-2-hydroxy)propyl-1,3,5,7-tetramethyl-TOTCYN hydrochloride (Example 44) in 50 ml. of acetonitrile was added 9.4 g. (0.12 mole) of acetyl chloride, causing solution of the suspended alcohol after a 10-minute interval. Stirring was continued at room temperature for 4 hours. The mixture was evaporated free of volatiles, washed with ethyl ether, again dried and then recrystallized from isopropyl alcohol to give 1.2 g. (51% yield) of pure product, M.P. 178–80° with sintering. The infrared spectrum was in accord with the O-acetylated product.

*Analysis.*—Calc'd for $C_{18}H_{32}ClNO_6$ (percent): C, 54.88; H, 8.19; N, 3.56. Found (percent): C, 55.08; H, 8.27; N, 3.57.

EXAMPLE 59

9-(2-butyryloxy-3-piperidino)propyl-1,3,5,7-tetramethyl-TOTCYN hydrochloride An 0.8 g. (0.0022 mole) portion of 9-(2-hydroxy-3-piperidino)propyl - 1,3,5,7-tetramethyl-TOTCYN hydrochloride (Example 49) was suspended in 25 ml. of acetonitrile and stirred with 2.3 g. (0.022 mole) of butyryl chloride at room temperature for a 3-hour period as in the preceding example. Removal of solvent and vacuum drying left a white residue which was crystallized from isopropyl alcohol to give 0.65 g. (68% yield) of product, M.P. (dec.) 218.5–221°. The infrared spectrum, in confirming the assigned structure, included bands at $3.8\mu$ and $3.95\mu$ (NH$^\ominus$), $5.78\mu$ (ester C=O), $8.13\mu$, $8.45\mu$ and $8.66\mu$ (TOTCYN C—O—C system with added absorption at $8.45\mu$ from the ester C—O), $10.69\mu$, $10.9\mu$ and $11.45\mu$ (—O—C—O).

*Analysis.*—Calc'd for $C_{21}H_{36}ClNO_6$ (percent): C, 58.12; H, 8.36; N, 3.23. Found (percent): C, 57.96; H, 8.72; N, 3.77.

EXAMPLES 60–66

By procedures analogous to those described in Examples 58 and 59, the following TOTCYN's were produced by reacting an acid chloride or anhydride with the indicated hydroxyl-containing TOTCYN:

(60) Dichloro-acetyl chloride plus the TOTCYN of Example 48 (hydrochloride) to produce 9-(3-dimethylamino - 2 - dichloroacetoxypropyl)-1,3,5,7-tetramethyl-TOTCYN hydrochloride, M.P. 206–207° C.

(61) Acetic anhydride plus the TOTCYN of Example 42 to produce 9-(3-chloro-2-acetoxypropyl)-1,3,5,7-tetramethyl-TOTCYN. I.R. and n.m.r. analyses agreed with the assigned structure.

(62) Acetyl chloride plus the TOTCYN of Example 48 (hydrochloride) to produce 9-(3-dimethylamino-2-acetoxypropyl)-1,3,5,7-tetramethyl-TOTCYN hydrochloride, M.P. 243.5–244° C. (dec.)

(63) Acetyl chloride plus the TOTCYN of Example 49 (hydrochloride) to produce 9-(3-piperidinyl-2-acetoxypropyl) - 1,3,5,7-tetramethyl - TOTCYN hydrochloride, M.P. 257–258° C. (dec.)

(64) Benzoyl chloride plus the TOTCYN of Example 48 (hydrochloride) to produce 9-(3-dimethylamino-2-benzoyloxypropyl) - 1,3,5,7 - tetramethyl-TOTCYN hydrochloride, M.P. 254° C. (dec.)

(65) Butyryl chloride plus the TOTCYN of Example 48 (hydroclorid) to produce 9-(3-dimethylamino-2-butyryloxypropyl) - 1,3,5,7 - tetramethyl-TOTCYN hydrochloride, M.P. 205–206° C.

(66) Acetyl chloride plus the TOTCYN of Example 47 to produce 9-[3-(4-benzylpiperidino)-2-acetoxypropyl] - 1,3,5,7-tetramethyl-TOTCYN hydrochloride, M.P. 227–229° C. (dec.)

The following examples, Nos. 67–77, are derivatives of TOTCYN carboxylic acids:

EXAMPLE 67

2-(1,3,5,7-tetramethyl-TOTCYN-9-yl)acetyl chloride

Thionyl chloride (21.4 g., 0.18 mole) was added dropwise over a twenty-minute period to a stirred solution, under nitrogen, of 22.0 g. (0.09 mole) of 1,3,5,7-tetramethyl - 2,4,6,8 - tetraoxatricyclo[3.3.1.0$^{3.7}$]nonane - 9 - acetic acid (Example 4) in 150 ml. of chloroform containing 2 drops of dimethylformamide. The resulting mixture was stirred for one hour and then purged for five hours with nitrogen at 25° C. to remove SO$_2$ and HCl. Evaporation of the resulting solution gave a brown solid which was dissolved in hexane and filtered to remove any starting material. Evaporation of the hexane solution gave 22.7 g. of solid which was dissolved in 300 ml. of methylene chloride and used in the preparation of further derivatives.

EXAMPLE 68

By a procedure analogous to that described in Example 67, thionyl chloride was reacted with 3-(1,3,5,7-tetramethyl-TOTCYN-9-yl)propionic acid (Example 5-B) to produce 3 - (1,3,5,7-tetramethyl-TOTCYN-9-yl)propionyl chloride.

EXAMPLE 69

3-(dimethylamino)propyl 2-(1,3,5,7-tetramethyl-TOTCYN-9-yl)-acetate hydrochloride 3-(N,N-dimethylamino)propanol (4.56 g. 0.0442 mole) was added dropwise over a ten-minute period to a stirred solution, under nitrogen, of 11.35 g. (0.0433 mole) of 1,3,5,7 - tetramethyl - 2,4,6,8 - tetraoxatricyclo [3.3.1.0$^{3.7}$]nonane-9-acetyl chloride (Example 67) in 150 ml. of methylene chloride and the resulting mixture stirred for 1.5 hours at 20°. Evaporation of the resulting solution gave a solid which was purified by dissolving in a small amount of methanol and precipitating with ethyl ether, giving 13.0 g. (82.1 percent yield) of crystalline product, M.P. 191–192° C.

*Analysis.*—Calc'd for $C_{16}H_{28}NO_6Cl$ (percent): C, 52.53; H, 7.71; N, 3.83. Found (percent): C, 52.54; H, 7.80; N, 3.78.

The product possessed an infrared spectrum in agreement with the expected structure.

EXAMPLE 70

N-3-(dimethylamino)propyl 3-(1,3,5,7-tetramethyl-TOTCYN-9-yl)-propionamide 3-(N,N-dimethylamino)propylamine (4.02 g., 0.0393 mole) was added dropwise over a twelve-minute period to a stirred solution, under nitrogen, of 10.66 g. (0.0386 mole) of 1,3,5,7 - tetramethyl - 2,4,6,8 - tetraoxatricyclo [3.3.1.0$^{3.7}$]nonane-9-propionyl chloride (Example 68) in 150 ml. of methylene chloride and the resulting mixture stirred for 4.5 hours at 6° C. Evaporation of the solution gave a solid which was purified by dissolving in chloroform followed by ether precipitation to give 7.1 g. (50.4 percent yield) of crystalline product. M.P. 170–171° C.

*Analysis.*—Calc'd for $C_{17}H_{31}NO_5Cl$ (percent): C, 53.89; H, 8.25; N, 7.39. Found (percent): C, 52.04; H, 8.35; N, 7.29.

The structure was confirmed by infrared analysis.

EXAMPLE 71

3-bromomethyl-1,5,7-trimethyl-TOTCYN-9 (N,N-diethyl) acetamide

A 19.52 g. (0.0604 mole) portion of 3-bromomethyl-1,5,7-trimethyl-TOTCYN-9-acetic acid (Example 12) was converted to the corresponding acid chloride by treatment with thionyl chloride (0.12 mole) in chloroform solution containing 2 drops of N,N-dimethylformamide according to the procedure of Example 67.

To a solution of 3.0 g. (0.041 mole) of diethylamine in 70 ml. of benzene was added 4.5 g. (0.013 mole) of the acid chloride, partially dissolved in 100 ml. of benzene, with stirring and initial cooling to 20°. A temperature kick occurred (ca. 10°) and, after stirring for 30 minutes, a white precipitate was filtered off and washed repeatedly with hot benzene. The benzene filtrate was evaporated to give a brown oil. The oil was taken up into ethyl ether, which solution was filtered free of solids and then evaporated. Since infrared analysis of the residue indicated carboxylic acid, the residue was partitioned between 10% aqueous $Na_2CO_3$ and ether twice, giving a final ether layer which, after evaporation, gave an oily product. Upon standing in a vacuum dessicator the oil solidified to crystals, M.P. ca. 62–72°. Recrystallization from diisopropyl ether gave 0.7 g. of the product, M.P. 80–81.5°.

*Analysis.*—Calc'd for $C_{15}H_{24}NO_5Br$ (percent): C, 47.63; H, 6.39; N, 3.70. Found (percent): C, 48.27; H, 6.55; N, 3.98.

The infrared spectrum supported the proposed structure.

EXAMPLE 72

By using a procedure analogus to that described in Example 71, except that dimethylamine was used in place of the diethylamine, there was produced 3-bromomethyl-1,5,7-trimethyl - TOTCYN - 9 - yl-(N,N-dimethyl)-acetamide, M.P. 87.5–93.5° C.

EXAMPLE 73

Ammonia was reacted with the TOTCYN-propionyl chloride of Example 68 to produce 1,3,5,7-tetramethyl-TOTCYN-9-yl-propionamide, M.P. 191–192° C.

*Analysis.*—Calc'd (percent): C, 56.02; H, 7.44; N, 5.44. Found (percent): C, 55.80; H, 7.37; N, 5.34.

EXAMPLE 74

Hydrazine was reacted with the TOTCYN-propionyl chloride of Example 68 to produce 1,3,5,7-tetramethyl-TOTCYN-9-yl-propionic acid hydrazide, M.P. 152–154° C.

*Analysis.*—Calc'd (percent): C, 52.92; H, 7.35; N, 10.3. Found (percent): C, 53.10; H, 7.23; N, 10.2.

EXAMPLE 75

3-(1,3,5,7-tetramethyl-TOTCYN-9-yl)propionic acid benzylidenehydrazide

A mixture of 1,3,5,7-tetramethyl-2,4,6,8-tetraoxatricyclo[3.3.1.0$^{3.7}$]nonane-9-propionic acid hydrazide (Example 74) (.50 g., .0018 mole), benzaldehyde (2.1 g., .02 mole) and absolute ethanol (20 ml.) was heated at 50° for three hours. After cooling, the solvent was evaporated and the crystalline residue recrystallized from isopropanol to give 0.45 g. of product, M.P. 183–185°. The I.R. and n.m.r. scan confirmed the structure.

*Analysis.*—Calc'd for $C_{19}H_{24}O_5N_2$ (percent): C, 63.3; H, 6.7; N, 7.8. Found (percent): C, 63.1; H, 6.8; N, 7.8.

EXAMPLE 76

9-(2-pyrrolidinocarbonylether)-1,3,5,7-tetramethyl-TOTCYN

A solution of 9-(2-chlorocarbonylethyl)-1,3,5,7-tetramethyl-TOTCYN in methylene chloride (50 ml.), prepared from 2.0 g. (0.0066 mole) of the corresponding carboxylic acid and thionyl chloride, was treated with pyrrolidine (5 g.) at room temperature for 3 hours. After washing with 2× 25 ml. water the organic layer was dried ($MgSO_4$) and evaporated to dryness. The syrup was induced to crystallize, and, after recrystallization from isopropyl ether, the amide (0.7 g., 34%) was collected as colorless crystals, M.P. 92–93.5°. Found (percent): C, 61.87; H, 8.21; N, 4.57; $C_{16}H_{25}NO_5$ requires (percent): C, 61.72; H, 8.09; N, 4.50. The I.R. spectrum showed absorption at 6.09μ (amide carbonyl) and other bands consistent with the structure. The n.m.r. spectrum showed singlets at 1.41 and 1.44 p.p.m. (1,3,5,7-methyls) and a triplet at 1.7 p.p.m. (hydrogen at position 9). The remaining fine structure was that expected from the 9-substituent.

EXAMPLE 77

Aniline was reacted with 3-(1,3,5,7-tetramethyl-TOTCYN-9-yl)propionyl chloride to produce N-phenyl 3 - (1,3,5,7 - tetramethyl - TOTCYN-9-yl)propionamide, M.P. 170–171° C.

EXAMPLE 78

9-(3-pyrrolidinopropyl)-1,3,5,7-tetramethyl-TOTCYN hydrochloride

A 0.58 g. (0.0008 mole) portion of the amide prepared in Example 76 was added to a slurry of lithium aluminum hydride (0.26 g.) in dry ether (25 ml.) and the mixture was heated at reflux for 17 hours. After cooling to 0°, water (0.3 ml.), 15% sodium hydroxide solution (0.3 ml.) and water (0.9 ml.) were added, in that order, according to the procedure of Micovic and Mihailovic.[1] After filtration and evaporation of the dried extract an oil (0.43 g., 77%) was obtained which was converted to the hydrochloride and recrystallized from isopropanol to give the product, M.P. 252° (dec.). Found (percent): C, 57.42; H, 8.31; N, 4.63; $C_{16}H_{23}O_4NCl$ requires (percent): C, 57.56; H, 8.45; N, 4.20.

The following examples, Nos. 79–78, illustrate the preparation of TOTCYN aldehydes and oxime derivatives thereof:

EXAMPLE 79

1,3,5,7-tetramethyl-TOTCYN-9-carboxaldehyde 9-(1-propenyl) - 1,3,5,7 - tetramethyl - TOTCYN (Example 30) (3.6 g., 0.0159 mole) was dissolved in a mixture of methanol (50 ml.) and methylene chloride (25 ml.) and cooled to −70°. Ozonized oxygen was introduced at a rate of 1 liter per minute or ca. 0.095 mole/hour. After half an hour a blue color, caused by excess ozone, had developed. The system was flushed thoroughly with nitrogen and allowed to warm to room temperature. Seven-eighths of the reaction mixture was then treated with magnesium (1.0 g.), water (25 ml.) and acetic acid (2 ml.). Over a three-hour period four additional 0.5 ml. portions of acetic acid were added. After this treatment no further peroxide remained. The solution was then freed undissolved magnesium and evaporated under reduced pressure, to give a solid (2.1 g., 80.5%), M.P. 94–95°. Further recrystallization from methanol gave the product M.P. 100–102°. Found (percent): C, 75.43; H, 6.85; $C_{10}H_{14}O_5$ requires (percent): C, 56.07; H, 6.59. The I.R. spectrum showed bands at 3.55 and 3.7μ (C—H stretching in the —CHO group) and 5.87μ (>C=O) as well as other absorption characteristic of the TOTCYN ring.

The 2,4-dinitrophenyl hydrazone of the above product was prepared in the usual way from the remaining eighth of the reaction mixture. Chromatography on acid-washed alumina followed by recrystallization from chloroform gave crystals M.P. >300°. Found (percent): C, 48.24; H, 4.54; N, 13.93; $C_{16}H_{18}O_8N_4$ requires (percent): C, 48.73; H, 4.60; N, 14.21.

EXAMPLE 80

1,3,5,7-tetramethyl-TOTCYN - 9 - carboxaldehyde (0.3 gm.) was treated with hydroxylamine hydrochloride (0.3 gm.) in the presence of anhydrous sodium acetate (0.3 g.) dissolved in water (2 ml.) and methanol (5 ml.). After brief heating the mixture was cooled and the resulting crystals (0.28 g., 87%) were collected. Recrystallization from aqueous methanol gave rhombs M.P. 143–146°.

---

[1] V. M. Micovic and M. L. Mihailovic, J. Org. Chem. 18, 1190 (1953).

Found (percent): C, 52.42; H, 6.53; N, 6.15; $C_{10}H_{15}NO_5$ requires (percent): C, 52.39; H, 6.60; N, 6.11. The I.R. spectrum was consistent with the expected structure.

EXAMPLE 81

1,3,5,7-tetramethyl-TOTCYN-9-carboxaldehyde O-(2-Cyclopentenylacetyl)oxime

To a solution of the 9-carboxaldehyde oxime of Example 80 (2.3 g.; 0.0095 mole) in dry benzene (30 ml.) containing pyridine (4.0 g.), 2-cyclopent-2-enylacetyl chloride (1.4 g., 0.0095 mole) was added and the resulting white suspension was heated at 40° for 0.5 hour. After cooling to room temperature and standing for four hours the benzene solution was washed twice with water and dried with magnesium sulphate. Evaporation of the dried solution gave 3.0 g. (88%) of a white solid. Recrystallization from cyclohexane and then from ethanol gave the product, M.P. 124–125.5°. Found (percent): C, 60.23; H, 6.92; N, 4.25. $C_{17}H_{23}NO_6$ requires (percent): C, 60.52; H, 6.87; N, 4.15.

EXAMPLE 82

1,3,5,7-tetramethyl-TOTCYN-9-carboxaldehyde O-propargyloxime

A solution of the 9-carboxaldehyde oxime of Example 80 (2.3 g., 0.01 mole) in dry methanol (25 ml.) was added to a solution of sodium (0.25 g.) in methanol (25 ml.), and redistilled 3-bromopropyne (1.3 g.) was added. The solution was refluxed for 1 hour. The resulting solution was evaporated to near dryness and chloroform (20 ml.) and water (5 ml.) were added. The organic layer was separated, washed with water, dried and evaporated to give an oily residue. After crystallization and recrystallization from aqueous methanol 0.7 g. of product, M.P. 97.5–98.5°, was obtained. Found (percent): C, 58.32; H, 6.43; $C_{13}H_{17}NO_5$ requires (percent): C, 58.42; H, 6.41.

EXAMPLE 83

1,3,5,7-tetramethyl-TOTCYN-9-carboxaldehyde O-methyloxime

The 9-carboxaldehyde of Example 79 (2.1 g. 0.01 mole) was refluxed for 2 hours with methoxyamine hydrochloride (0.9 g.) and anhydrous sodium acetate (1.0 g.) in 10 ml. water containing sufficient ethanol to secure homogeneity. After cooling, 2.3 g. of crystals, M.P. 140–143°, were collected. Recrystallization from ethanol gave 2.15 g. (90%) of the product, M.P. 140–143°. Found (percent): C, 55.01; H, 7.28. $C_{11}H_{17}NO_5$ requires (percent): C, 54.31; H, 7.04.

EXAMPLE 84

1,3,5,7-tetramethyl-TOTCYN-9-formohydroxamyl chloride

To a solution of the 9-carboxaldehyde oxime of Example 80 (5.0 g., 0.021 mole) in 10 ml. of chloroform was added 400 g. of a 9.5% solution of chlorine in chloroform with cooling to maintain the temperature at 0–5°. A precipitate formed and the yellow colour of the solution changed to green. Evaporation gave 6.5 g. of a solid which was recrystallized with difficulty from chloroform to give the product, M.P. 197–201° C., in a final yield of 77% Found (percent): C, 45.43; H, 5.43; $C_{10}H_{14}NO_5Cl$ requires (percent): C, 45.55; H, 5.35.

EXAMPLE 85

1,3,5,7-tetramethyl TOTCYN-9-N-[2-N-pyrrolidino)-ethyl]-carboxamidoxime hydrochloride To a stirred slurry of the hydroxamoyl chloride of Example 84 (3.0 g., 0.014 mole) in ethanol (15 ml.) was added N(2-aminoethyl)pyrrolidine (1.3 g., 0.014 M) dissolved in a few ml. of ethanol. The mixture was heated for half an hour and then allowed to stand. Evaporation and recrystallization from ethanol gave 2.2 g. of product M.P. 238–239.5°. Found (percent): C, 50.77; H, 7.53; N, 10.91; $C_{16}H_{28}O_5N_3Cl$ requires (percent): C, 50.86; H, 7.47; N, 11.12.

EXAMPLE 86

1,3,5,7-tetramethyl-TOTCYN-9-N-butylcarboxamidoxime

The crude hydroxamyl chloride of Example 84 (5.7 g., 0.022 mole) was suspended in ethanol (40 ml.) and n-butylamine (5.0 g., 0.07 mole) was added to the mixture. When the ensuing exothermic reaction had subsided the solution was heated at 65° for five minutes, cooled and evaporated to give 8.7 g. of a solid. This was washed with water and then recrystallized from aqueous ethanol to give 5.0 g. of a fawn solid, M.P. 102–105°. Further recrystallization and treatment with activated charcoal gave pure product, M.P. 105–106.5°. Found (precent): C, 56.25; H, 8.17; N, 9.43. $C_{14}H_{24}NO_5$ requires (percent): C, 55.98; H, 8.05; N, 9.33.

EXAMPLE 87

1-(1,3,5,7-tetramethyl-TOTYCN-9-carbonyl)pyrrolidine oxime

The subject compound was prepared from pyrrolidine and the above hydroxamyl chloride in a manner analogous to that of Example 86 Recrystallization from methanol gave crystals M.P. 189–195°. Found (percent): C, 56.02; H, 7.49; $C_{14}H_{22}N_2O_5$ requires (percent): C, 56.36; H, 7.43.

EXAMPLE 88

S-methy 1,3,5,7-tetramethyl-TOTCYN-9-thioformohydroxamate

To a stirred slurry of the hydroxamoyl chloride of Example 84 (3.0 g., 0.014 M) in methanol (20 ml.) was added 10 ml. of methanolic sodium methyl mercaptide (containing 0.023 M of Methyl mercaptan) and acetone (75 ml.) and the mixture was then refluxed for half an hour. The solution was evaporated and poured into water. From the aqueous solution a solid slowly crystallized over several days. The combined solids were recrystallized repeatedly from ethanol to give 1.6 g. of product, M.P. 242–244° d. Found (percent): C, 47.99; H, 6.35; N, 4.97; $C_{11}H_{17}O_5NS$ requires (percent): C, 47.99; H, 6.22; N, 5.09.

EXAMPLE 89

2-(1,3,5,7-tetramethyl-TOTCYN-9-yl)acetaldehyde 9-allyl-1,3,5,7-tetramethyl-TOTCYN (25.4 g., 0.225 moles) was ozonized in anhydrous methanol 250 ml.) and methylene chloride 125 ml.) at −60°, until a blue colour developed. The excess ozone was immediately removed by a stream of nitrogen, the mixture was warmed to −10° and a solution of sodium iodide 76.4 g.)in 27 ml. glacial acetic acid and 50 ml. of water was added without delay. The temperature rose to 10° and the liberated iodine was reduced with 150 ml. of a solution of sodium thiosulphate 112 g.) in 100 ml. of water. The mixture was rapidly evaporated at 30° and 50 mm. and when the methanol had been removed the white precipitate was collected and dried to give 29.6 of crude product, M.P. 104–108 incomplete). This crude product was contaminated with finely divided sulphur. Filtration of an ethereal solution through "hiflo" afforded a clear solution. Evaporation of this gave 20 g. of pure product as needles, M.P. 109.5–110°. The yield was 80% of theory. Found (percent): C, 57.75; H, 7.01; $C_{11}H_{16}O_5$ requires (percent): C, 57.88; H, 7.05.

EXAMPLE 90

9-2-pyrrolidinovinyl)-1,3,5,7-tetramethyl-TOTCYN

The 9-acetaldehydederivative of Example 89 (6.9 g., 0.03 mole) was heated to reflux in dry benzene containing pyrrolidine (2.1 g., 0.03 mole). Loss of water began at once (in the absence of any catalyst) and the reaction was complete before reflux was reached. The reaction mixture was evaporated to dryness and the solid was recrystallized from cyclohexane to give 6.5 g. 76%) of the product, M.P. 122–124°. Found (percent): C, 64.16; H, 8.15. $C_{15}H_{23}O_4N$ requires (percent): C, 64.03; H, 8.24.

EXAMPLE 91

2-(1,3,5,7-tetramethyl-TOTCYN-9-yl)acetaldehyde oxime 3.0 g. of 2-(1,3,5,7-tetramethyl-TOTCYN-9-yl)acetaldehyde, 1.2 g. of hydroxylamine hydrochloride and 2 g. of anhydrous sodium acetate were dissolved in a mixture of 10 ml. of ethanol and 2.0 ml. of water, and the resulting mixture refluxed for one hour. Evaporation of volatile materials was then performed, followed by chloroform extraction of the residue. The chloroform extract was evaporated and the resulting material recrystallized from ethanol to give 1.2 g. of product, M.P. 113–116.5°.

Analysis.—Calc'd. for $C_{11}H_{17}NO_5$ (percent): C, 54.31; H, 7.04; N, 5.76. Found (percent): C, 54.32; H, 7.26; N, 5.86.

EXAMPLE 92

1,3,5,7-tetramethyl-9-(N-benzylformimidoyl)-2,4,6,8-tetraoxatricyclo[3.3.13.7]nonane The parent aldehyde (Example 79) (4.0 g. 0.0188 M) was refluxed with benzylamine (6.0 g.) and benzene (25 ml.) for 1 hour. The mixture was evaporated and recrystallized from isopropanol to give colorless crystals (3.4 g. 57%) M.P. 74–75°. Found (percent): C, 67.42; H, 7.18, $C_{17}H_{21}O_4N$ requires (percent): C, 67.31; H, 6.98.

EXAMPLE 93

1,3,5,7-tetramethyl-9-[N-2(2-pyridyl)ethylformimidoyl]-2,4,6,8-tetraoxatricyclo[3.3.1.03.7]nonane The parent aldehyde (Example 79) (4.9 g. 0.0188 M) was refluxed for 1 hour with 2-(2-aminoethyl)pyridine (4.0 g.) and dry benzene 100 ml. Evaporation gave pale yellow crystals (7.72 g.) which were recrystallized from isopropanol to give colorless crystals M.P. 105–109°. Further recrystallization gave 4.05 g. of crystals M.P. 110–112°. Found (percent): C, 64.11; H, 6.73; N, 9.05; $C_{17}H_{22}O_4N_2$ requires (percent): C, 64.13; H, 6.96; N, 8.80.

EXAMPLES 94–96

By procedures analogous to those described in Examples 79 and 89, the following TOTCYN aldehydes were prepared from the corresponding olefins, Examples 32, 7 and 31, respectively:

(94) 3-Chloromethyl - 1,5,7 - trimethyl - TOTCYN-9-yl-carboxaldehyde, (converted to oxime for analysis; see below, Example 97).

(95) 2-(3-Chloromethyl - 1,5,7 - trimethyl-TOTCYN-9-yl)-acetaldehyde, M.P. 130–133° C.

Analysis.—Calc'd (percent): C, 50.29; H, 5.76. Found (percent): C, 50.22; H, 5.79.

(96) 1,5-dimethyl-TOTCYN - 9- yl - carboxaldehyde. Infrared analysis agreed with the assigned structure.

EXAMPLE 97

The aldehyde of Example 94 was reacted with hydroxylamine by a procedure analogous to that described in Example 80 to produce 3-chloromethyl-1,5,7-trimethyl-TOTCYN-9-yl-carboxaldehyde oxime; M.P. 121–124° C.

Analysis.—Calc'd (percent): C, 45.55; H, 5.35; N, 5.31. Found (percent): C, 45.64; H, 5.72; N, 5.11.

EXAMPLE 98

The aldehyde of Example 79 was reacted with $NH_2NHCO_2CH_3$ (i.e., the reaction product of hydrazine and methyl carbonate) to produce 9-(methoxycarbonylhydrazonomethyl)-1,3,5,7 - tetramethyl - TOTCYN M.P. 218–222° C.

Analysis.—Calc'd (percent): C, 50.34; H, 6.33. Found (percent): C, 50.41; H, 6.41.

This compound has the formula:

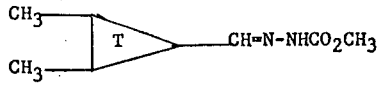

The following examples, Nos. 99–103, illustrate the preparation of some unsaturated TOTCYN's, both olefinic and acetylenic:

EXAMPLE 99

9-(3-bromopropenyl)-1,3,5,7-tetramethyl-TOTCYN

A mixture of 9-(1-propenyl) - 1,3,5,7 - tetramethyl-TOTCYN (Example 30) (2.3 g., 0.01 mole), N-bromosuccinimide (1.8 g., 0.01 mole), 30 ml. of $CCl_4$ and a few crystals of benzoyl peroxide was stirred for 2 hours at ambient temperature, after which irradiation with a 275-watt sunlamp began and was continued at a temperature of about 50° for 3–4 hours. After standing overnight, the mixture was filtered and the filtrate freed of solvents by evaporation giving an oily product. The latter underwent partial solidification on standing. Washing with cyclohexane left 0.75 g. of solid, M.P. 76–82.5°, indicated by n.m.r. analysis to be almost pure 3-bromopropenyl product.

Analysis.—Calc'd. for $C_{12}H_{17}BrO_4$ (percent): C, 47.23; H, 5.62. Found (percent): C, 47.14; H, 5.83.

The oily component of the original product mixture contained the 3-bromopropenyl derivative contaminated with unreacted starting material.

EXAMPLE 100

By a procedure analogous to Example 99, the 9-allyl-TOTCYN (Example 6) was reacted with N-bromosuccinimide to produce 9-(1-bromoallyl)-1,3,5,7-tetramethyl-TOTCYN. Infrared and n.m.r. analyses agreed with the assigned structure.

EXAMPLE 101

1,6-bis(1,3,5,7-tetramethyl-2,4,6,8-tetraoxatricyclo [3.3.1.0³·⁷]non-9-yl)-2,4-hexadiyne 9-propargyl - 1,3,5,7 - tetramethyl - TOTCYN (Example 11) (3.5 g.), cupric acetate (0.1 g.) and paraformaldehyde (1.5 g.) were shaken in a Paar bomb containing a solution of dimethylamine (10 g.) in 25 ml. of dioxane at 100° for 20 hours. Dilution of the product with methanol gave 1.6 g. of a white solid, M.P. 201–207°, which was not wettable by water. The filtrate was evaporated to a syrup, diluted with water, made acid (HCl) and extracted with chloroform. Evaporation of the dried (MgSO₄) chloroform extract gave 0.8 g. of a solid, M.P. 207–208°, undepressed on admixture with the material above. The total yield was 2.4 g. (69%). The aqueous layer was then basified with 20% sodium hydroxide and extracted with chloroform. Evaporataion of the dried chloroform extract gave 0.7 g. of a very dark syrup which was not investigated further. Recrystallization of the solid, M.P. 201–207°, from chloroform-methanol gave crystals of pure product, M.P. 212–214°. Found (percent): C, 64.21; H, 6.77; $C_{24}H_{30}O_8$ requires (percent): C, 64.56; H, 6.77.

EXAMPLE 102

9-(4-dimethylaminobutyn-2-yl)-1,3,5,7-tetramethyl-TOTCYN hydrochloride 9-(2-propynyl) - 1,3,5,7 - tetramethyl - TOTCYN (Example 11) (5.6 g., 0.025 mole), dimethylamine (10 g.), paraformaldehyde (10 g.) and dry dioxane (50 ml.) were placed in a 500 ml. Paar bomb together with a few crystals of ferric chloride. After purging, nitrogen was passed until the pressure reached 500 p.s.i. The system was closed and heated at 100° for 8 hours. The cooled contents of the vessel were evaporated to a syrup which on addition to aqueous 5% hydrochloride acid gave a semi-solid mass. This was dissolved in chloroform and extracted three times with 5% hydrochloric acid.

The aqueous layer was basified with 15% sodium hydroxide solution and extracted with three portions of chloroform. The dried (MgSO$_4$) extract was evaporated to syrup, dissolved in ether, and treated with gaseous hydrogen chloride. The product was obtained as a colorless solid (2.2 g.), M.P. 211–212°. Found (percent): C, 56.70, H, 7.68; N, 4.47; C$_{16}$H$_{24}$O$_4$NCl requires (percent): C, 56.51; H, 7.90; N, 4.39. I.R. and n.m.r. spectra confirmed the structure.

EXAMPLE 103

9-[4-(1-pyrrolidino)2-butynyl]-1,3,5,7-tetramethyl-TOTCYN

9 - (2 - propynyl)-1,3,5,7 - tetramethyl - 2,4,6,8-tetraoxatricyclo[3.3.1.0$^{3,7}$]nonane (Example 11) (11.2 g., 0.05 mole), paraformaldehyde (10.0 g.) and pyrrolidine (10.6 g., 0.15 mole) were dissolved in dioxane (30 ml.) containing a crystal of ferric chloride and the mixture was heated in a 500 ml. glass lined Paar bomb with nitrogen at 100° under autogenous pressure for 6 hours. The contents were evaporated to give a lemon yellow semi-solid which was warmed with 50 ml. 5% hydrochloric acid and filtered. The solid residue was extracted once more with 5% hydrochloric acid and this filtrate was combined with the first acid extract. The residual solid was recrystallized from ethanol to give 5.3 g. of starting material, M.P. 116–118°.

The combined filtrates were basified and the crystalline precipitate was dried and recrystallized from cyclohexane to give the desired product 4.9 g., (60%), M.P. 94–95°. Found (percent): C, 66.32; H, 8.28; C$_{17}$H$_{25}$NO$_4$ requires (percent): C, 66.42; H, 8.20.

The following examples, Nos. 104–106, illustrate the preparation of some saturated amino-TOTCYN's by reduction of an acetylene, an olefin, and an oxime, respectively:

EXAMPLE 104

9-(4-pyrrolidinobutyl)-1,3,5,7-tetramethyl-TOTCYN hydrochloride

The corresponding 4-pyrrolidino-2-butynyl derivative of Example 103 (1.54 g., 0.005 mole) was hydrogenated at atmospheric pressure in ethanol solution using 5% platinum-on-charcoal as catalyst. After a period of 1.33 hours 110% of the theoretical amount of hydrogen had been absorbed. After removal of the catalyst the solvent was evaporated to give 1.55 g. of an oil. This was converted to the product hydrochloride of which 0.9 g., was obtained, M.P. 211–212° after recrystallization from isopropanol. Found (percent): C, 58.34; H, 8.86; N, 4.20; C$_{17}$H$_{30}$O$_4$NCl requires (percent): C, 58.69; H, 8.69; N, 4.03.

EXAMPLE 105

9-(2-pyrrolidinoethyl)-1,3,5,7-tetramethyl-TOTCYN hydrochloride

The 9-pyrrolidinovinyl compound of Example 90 (5.75 g., 0.0205 mole) was hydrogenated at 45 p.s.i. and 25° in 125 ml. of ethanol solution using 5% palladium-on-charcoal for a 3-hour period. The reaction was worked up in the usual manner and 4.4 g., of the hydrochloride, M.P. 225-227°, was obtained after recrystallization from acetone. Found (percent): N, 4.57; C$_{15}$H$_{27}$NO$_4$Cl requires (percent): N, 4.40.

EXAMPLE 106

9-aminomethyl-1,3,5,7-tetramethyl-TOTCYN hydrochloride

The amine was prepared by lithium hydride reduction of the oxime of Example 80 by the manner described in Example 78. Crystals of the product, M.P. 197° (d.), were obtained from isopropanol in 83% yield. Found (percent): C, 47.76; H, 7.33; C$_{10}$H$_{18}$O$_4$NCl requires (percent): C, 47.72; H, 7.21 I.R. and n.m.r. spectra confirmed the structure.

The following example, No. 107, illustrates the use of a TOTCYN aldehyde in a Grignard reaction:

EXAMPLE 107

9-acetyl-1,3,5,7-tetramethyl-2,4,6,8-tetraoxatricyclo [3.3.1.0$^{3,7}$]-nonane

The corresponding 9-formyl compound (Example 79) (25.0 g. 0.116 M) was added to a solution of methyl magnesium iodide made from magnesium (8.5 g) and methyl iodide (50.0 g., 0.35 M) in 300 ml. of ether. After the initial exotherm, the mixture was refluxed for 2 hours and then cooled and quenched with 100 g. of ice and acidified with 75 ml. of 5% hydrochloric acid. The layers were separated with the aid of chloroform, dried and evaporated. The crude crystalline product, M.P. 64–66° was oxidized without further purification, by dropwise addition of the Jones Reagent[2] (14.5 ml.-prepared from 26.7 g. chromium trioxide, 23.0 ml. concentrated sulphuric acid and water to a total volume of 100 ml.) to its solution in acetone (75 ml.) at 20–25°. The green mixture was diluted with ice water and washed to give 17.9 g. of greenish crystals M.P. 104–105°. Recrystallization gave colorless crystals M.P. 105–107°. Found (percent): C, 57.64; H, 6.99; C$_{11}$H$_{16}$O$_5$ requires (percent): C, 57.88; H, 7.07.

The following examples, Nos. 108–111, illustrate the preparation of a TOTCYN acid chloride and three amido derivatives thereof:

EXAMPLE 108

9-chlorocarbonyl-1,3,5,7-tetramethyl-2,4,6,8-tetraoxatricyclo-[3.3.1.0$^{3,7}$]nonane The corresponding carboxylic acid, prepared by oxidation of the aldehyde (Example 79) with peracetic acid, (15.4 g., 0.067 M) was added to a solution of thionyl chloride (11.0 g.) in methylene chloride (200 ml.) containing 2 drops of N,N-dimethylformamide. After refluxing for 3 hours the solvent was removed to give 15.3 g. of nearly pure acid chloride. In another run this product was recrystallized from isopropanol to give colorless crystals M.P. 110–112°. Found (percent): C, 48.71; H, 48.30; C$_{10}$H$_{13}$O$_5$Cl requires (percent): C, 48.30; H, 5.27.

EXAMPLE 109

1,3,5,7-tetramethyl-9-(N-4-picolyl)formamido-2,4,6,8-tetraoxatricyclo[3.3.1.0$^{3,7}$]nonane The parent acid chloride (Example 108) (6.5 g. 0.026 M) 4-picolylamine (4.0 g.), and methylene chloride (70 ml.) were mixed and allowed to stand overnight. A 5% solution of sodium hydroxide was added, the organic layer was dried and evaporated to give a yellow solid 6.3 g. M.P. 138–145° repeated recrystallization from ethanol gave 3.85 g. M.P. 165.5–167.5°. Found (percent): C, 59.31; H, 6.61; N, 8.70; C$_{16}$H$_{20}$O$_5$N$_2$; requires (percent): C, 59.99; H, 6.29; N, 8.74.

EXAMPLE 110

1,3,5,7-tetramethyl-9-(N-benzylformamido)2,4,6,8-tetraoxatricyclo[3.3.1.0$^{3,7}$]nonane A mixture of the parent acid chloride (Example 108) (6.5 g. 0.026 M), benzylamine (5.4 g.) and methylene chloride (70 ml.) were kept at room temperature overnight. Water was added and the organic layer was dried and evaporated. Recrystallization of the solid residue from ethanol gave colorless crystals (4.85 g.) M.P. 143–144°. Found (percent): C, 63.89; H, 6.57; N, 4.47; C$_{17}$H$_{21}$O$_5$N requires (percent): C, 63.94; H, 6.63; N, 4.38.

---
[2] J. Chem. Soc. 1953, p. 2548.

EXAMPLE 111

9-carboxamido-1,3,5,7-tetramethyl-2,4,6,8-tetraoxatricyclo[3.3.1.0$^{3.7}$]nonane The corresponding acid chloride (Example 108) (15.3 g. 0.0617 M) was dissolved in benzene (50 ml.). Ammonium hydroxide (25 ml.) was added slowly and after the exothermic reaction had subsided the white solid was collected, dried in chloroform solution to give after evaporation 9.0 g. of colorless crystals M.P. 208–212°. Recrystallization from methanol gave the pure amide M.P. 215–216°. Found (percent): C, 52.78; H, 6.51; N, 6.06; $C_{10}H_{15}O_5N$ requires (percent): C, 52.39; H, 6.60; N, 6.11.

EXAMPLE 112

9-ethoxycarbonylamino-1,3,5,7-tetramethyl-2,4,6,8-tetraoxatricyclo[3.3.1.0$^{3.7}$]nonane 1,3,5,7 - tetramethyl-2,4,6,8-tetraoxatricyclo[3.3.1.0$^{3.7}$]nonane-9-carboxylic acid (11.5 g., 0.05 M) was treated in acetone (100 ml.) at 0–2°, with triethylamine (6.1 g. 0.06 M) in acetone (25 ml.). Then ethyl chloroformate (7.5 g. 0.07 M) in acetone (25 ml.) was added over 10 minutes at 0–2°. After standing for ½ hour, sodium azide (5.2 g. 0.08 M) in water, 20 ml., was added at −5° to +1°. The mixture was allowed to stand for two hours below +5°, and poured into 500 ml. ice water (no precipitate), extracted twice with 50 ml. toluene, and finally with ether. The dried extracts were evaporated until crystals began to form. (The I.R. spectrum showed bands corresponding to azide and isocyanate). The material was dissolved in toluene and heated to 95° (gas evolution started at 70°) for ½ hour. Ethanol 25 ml. was then added and the mixture was refluxed for 2 hours. After evaporation, 5.1 g. of colorless crystals M.P. 78° were obtained. Recrystallization from cyclohexane afforded the pure carbamate M.P. 78–80°. Found (percent): C, 52.55; H, 6.88; N, 4.77; $C_{12}H_{19}O_6N$ requires (percent): C, 52.74; H, 7.01; N, 5–13.

EXAMPLE 113

9-amino-1,3,5,7-tetramethyl-2,4,6,8-tetraoxatricyclo-[3.3.1.0$^{3.7}$]-nonane

The corresponding ethyl carbamate (Example 112) (2.75 g., 0.01 M) was refluxed in a heterogeneous mixture of 40% aqueous sodium hydroxide (60 ml.) and ethanol (20 ml.) for 20 hours. The ethanol was then removed by evaporation when fine platelets, soluble in water, were obtained. The mixture was acidified cautiously with hydrochloric acid and after the vigorous gas evolution, was heater at a pH of 4 for 1 hour on a steam bath. After cooling, sodium hydroxide was added until strongly basic and crystals, 0.5 g., soluble in water, were collected, M.P. 64–65°. The mother liquor was extracted with methylene chloride and the dried extract afforded a further 0.8 g. of crystals. Recrystallization from n-hexane gave the pure primary amine M.P. 69–71°. Found (percent): C, 53.7; H, 7.51; N,6.66; $C_9H_{15}O_4N$ requires (percent): C, 53.72; H, 7.51; N, 6.96.

The TOTCYN's and TOTCYD's of the invention have very wide utility. For instance, many of the compounds of the invention have been found to exhibit activity as agricultural chemicals. The particular test procedures used for determining agricultural chemical activity were the following:

BACTERICIDE AGAR INCORPORATION TEST (Conducted with plant pathogens)

Test Organisms:
*Pseudomonas tabaci* (wildfire)
*Erwina amylovora* (fireblight)
*Corynebacterium michiganse* (bacterial canker)
*Agrobacterium tumefaciens* (corn gall)
*Xanthomonas vesicatoria* (bacterial spot)

ᵃ Soil is Norfolk sandy loam.

These organisms are cultured on Difco nutrient agar. Cultures are transferred one week prior to use.

Application of toxicant.—Measure 18 ml. aliquots of Difco prepared nutrient agar media into 50 ml. Erlenmeyer flasks, plug with cotton, and autoclave for 20 minutes. Cool in a constant temperature water bath to 50°–60° C. Add 2 ml. of test solution to a 18 ml. sample of agar in the flask, agitate well to inrure uniform mixing of chemical and agar, and immediately pour into sterile Petri dishes. When agar has solidified, it is ready for inoculation. The agar dishes are inoculated with a transfer loop. Heat the loop until it is red hot, allow to cool, gently rub the surface of the bacterial colony, and streak on agar toxicant mixture in a designated area by starting at the center of the dish and working toward the edge in a spoke-like fashion. Repeat this procedure using other areas of the dish for other organisms. Use sterile technique throughout the inoculation procedure Concentration of toxicant.—The test compounds are formulated by a standard procedure of solution in acetone, addition of an emulsified, and dilution with water. Primary screening tests are conducted at 100 p.p.m. of chemical in agar by adding 2 ml. of standardly prepared 1,000 p.p.m. test solution to 18 ml. of agar.

Holding conditions.—The inoculated dishes are incubated for a period of 2 days at a constant temperature of 30° C.

Indicative response.—The ability of a compound to inhibit growth of bacteria is visually rated according to the following designations:
5=no growth
3=moderate growth
1=equal to the untreated control.

EARLY BLIGHT TOMATO FOLIAGE DISEASE PROTECTANT TEST

Test organism.—Tomato early blight fungus (*Alternaria solani*). The organism is cultured on potato dextrose agar at a temperature of 20° C. Transfers are made to Petri dishes 8 days prior to testing and scraped and irradiated with ultraviolet for one minute one day prior to testing.

Application of toxicant.—One tomato plant variety Bonny Best of a standard age and height is sprayed on a revolving turntable. A 100–110 ml. volume of the formulated water mixture of chemical is applied to each plant with a DeVilbiss spray gun, air pressure set at 40 pounds. Application of this volume of spray takes 25 seconds. The potted plants are then placed in an 8 ounce waxed cup (Lily-Tulip Cup Corporation, Item No. 1708S). An additional 40 ml. volume of test formulation (II) is "watered" into the soil for determination of systemic activity. Similar applications to other plants are made with a water solution containing acetone and emulsifier in the same concentration as the test mixture but without the candidate pesticide. These plants are untreated checks or controls for the experiment. As soon as the spray has dried, the plants are inoculated by again placing them on the turntable and spraying with a spore suspension of early blight (containing 12,000–15,000 spores per ml. of water) for 30 seconds at 20 pounds pressure.

Concentration of toxicant.—The test compounds are formulated by a standard procedure of solution in acetone, addition of an emulsifier, and dilution with water. Primary topical applications are conducted at 100 p.p.m. (I) and systematic tests at 250 p.p.m. (II).

Holding conditions.—Following inoculation the plants are incubated for 24 hours at 70° F. and 100 percent relative humidity. The plants are then removed from the incubation chamber and held for an additional 24 hours at room temperature.

Indicative response.—The degree of infection is visually rated according to the following designations:
5=no lesions (perfect control)
4=very few lesions 3 = moderately infected
1 = many lesions, equal to untreated control plants

SOIL FUNGICIDE TEST

Pythium surface mycelial growth test

Test organism.—*Pythium de baryanum* infecting artificially inoculated soil.[3] The fungus is cultured on corn meal by the following method.

Corn meal-sand medium

|   | ml. |
|---|---|
| Quaker brand enriched degerminated Yellow corn meal. | 600 |
| Washed sand[1] | 700 |
| Deionized water | 500 |

[1] The sand is washed with water by inserting end of water hose into a deep container and then pouring sand into the container. The sand is stirred, and the water allowed to overflow so as to flush out debris. This procedure is repeated 3 times. Decant off excess water and mix the wet sand with corn meal and water in a shallow porcelain pan. Cover the pan with Aluminum foil and autoclave for 30 minutes at 15 pounds p.s.i.

Allow to cool, slice mixture into ¾ inch cubes and place in pint Mason jars. Plug jar and autoclave for 30 minutes at 15 pounds p.s.i. Upon removal of jars from the autoclave, shake them well in order to have as much air space as possible between cubes. Inoculate when jars reach room temperature.

Week-old cultures are used to infect soil. Two jars of cubes are mixed thoroughly by hand with one flat of sterile soil. The infected soil is then placed in paper cups (Lily-Tulip Cup Corporation, No. 143, 4 ounce Squat Containers—treated).

The soil may be inoculated and transferred into cups 24 hours prior to testing.

Application of toxicant.—A 20 ml. volume of the standardly prepared test formulation of compound is drenched onto each of 2 paper cups containing the infested soil.

Concentration of toxicant.—The test compounds are formulated by a standard procedure of solution in acetone, addition of an emulsifier, and dilution with water. Primary screening tests are conducted at 50 pounds per acre.

Holding conditions.—The treated cups are incubated for 2 days at 70° F. and 96 percent relative humidity.

Indicative response.—Following the incubation period the amount of surface mycelial growth is visually rated according to the following designations:

5 = no growth
4 = one or two colonies
3 = surface one-half covered with colonies
2 = surface three-fourths covered with colonies
1 = growth equal to controls

SOIL FUNGICIDE TEST

Fusarium surface mycelial growth test

Test organism.—*Fusarium oxysporum f. lycopersici* infecting artificially inoculated soil. The fungi are cultured on corn meal by the following method:

Corn meal-sand medium

|   | Ml. |
|---|---|
| Quaker brand enriched degerminated Yellow corn meal. | 600 |
| Washed sands * | 700 |
| Deionized water | 500 |

*The sand is washed with water by inserting end of water hose into a deep container and then pouring sand into the container. The sand is stirred, and the water allowed to overflow so as to flush out debris. This procedure is repeated 3 times. Decant off excess water and mix the wet sand with corn meal and water in a shallow porcelain pan. Cover the pan with aluminum foil and autoclave for 30 minutes at 15 pounds p.s.i.

Allow to cool, slice mixture into ¾ inch cubes, and place in pint Mason jars. Plug jars and autoclave for 30 minutes at 15 pounds p.s.i. Upon removal of jars from the autoclave shake them well in order to have as much air space as possible between cubes. Inoculate when jars reach room temperature.

Three week old cultures are used to infect soil. Mix thoroughly by hand 2½ jars of cubes with one flat of sterile soil. The infected soil is then dispensed into paper cups (No. 143, 4 ounce Squat Containers—treated, Lily-Tulip Cup Corporation).[1]

The soil may be inoculated and transferred to cups 24 hours prior to testing.

Application of toxicant.—A 20 ml. volume of the standardly prepared test formulation of the compound is drenched onto each of 2 paper cups containing the infested soil.

Concentration of toxicant.—The test compounds are formulated by a standard procedure of solution in acetone, addition of an emulsifier, and dilution with water. Primary screening tests are conducted at 50 pounds per acre.

Holding conditions.—The treated cups are incubated for 2 days at 70° F. and 96 percent relative humidity.

Indicative response.—Following the incubation period the amount of surface mycelial growth is visually rated according to the following designations:

5 = no growth
4 = one or two colonies
3 = surface one-half covered with colonies
2 = surface three-fourths covered with colonies
1 = growth equal to check.

NEMATOCIDE TEST

Test organism.—Infective migratory larvae of the root-knot nematode, *Meloidogyne incognita* var. acrita, reared in the greenhouse on roots of coleus, tomato, or tobacco plants. Infected plants are removed from the culture, and the roots are chopped very finely. A small amount of this inoculum is added to a pint Mason jar containing approximately 180 cc. of soil. The jars are capped and incubated for one week at room temperature. During this period eggs of the nematode hatch, and the larval forms migrate into the soil.

Application of toxicant.—Ten ml. of the test formulation are added to each of two jars for each dosage tested. Following the addition of chemical, the jars are capped, and the contents thoroughly mixed on a ball mill for 5 minutes.

Concentration of toxicant.—The test compounds are formulated by a standard procedure of solution in acetone, addition of an emulsifier, and dilution with water. Primary screening tests are run at 10 mg. and 2.5 mg. of the test compound per jar which is approximately 75 pounds and 19 pounds per acre.

Holding conditions.—The jars remain capped at room temperature for a period of 48 hours, and the contents are then transferred for 3 inch pots. Subsequently, the pots are seeded to cucumber as an indicator crop and placed in the greenhouse where they are cared for in the normal fashion for approximately 3 weeks.

Indicative response.—The cucumber plants are taken from the pots, the soil removed from the roots, and the amount of galling visually rated according to the following designations:

1 = severe galling, equal to untreated plants
2 = moderate galling
3 = light galling
4 = very light galling
5 = no galling, perfect control

TOMATO SUCKERING TEST

Test plant.—Tomato, var. Bonny Best (*Lycopersicon esculentum*), age approximately 6 inches in height. The apical tip is excised prior to spraying.

[1] The soil employed is Norfolk sandy loams.

Application of toxicant.—The test plants, one for each compound, are sprayed on a revolving turntable for 25 seconds, at 40 pounds p.s.i. with a DeVilbiss type spray gun. Approximately 100–110 ml. of spray are delivered. An equal volume of a water solution containing acetone and emulsifier in the same concentration as the herbicidal mixture but without the candidate herbicide is also sprayed on several plants. These are employed as checks or controls.

Concentration of toxicant.—The test compounds are formulated by a standard procedure of solution in acetone, addition of an emulsifier, and dilution with water. Primary screening tests are conducted at 2,500 p.p.m.

Holding conditions.—The plants are removed to the greenhouse and cared for in the normal manner until results are taken.

Indicative response.—Approximately 12 days after application of chemical, visual observations are made of the degree of inhibition of lateral growth or suckers and the degree of injury. The following designations are employed:

Suckering rating

5=complete inhibition
4=good inhibition
3=fair inhibition
1=poor inhibition

Injury rating

5=plant dead
4=severe injury
3=moderate injury
2=slight injury
1=no injury

PRELIMINARY HERBICIDE SEED GERMINATION TEST

Test seeds.—The following seeds are used in this test:
Perennial rye grass—*Solium perenne*
Pearl millet—*Setaria italica* var. stramineofructa
Mustard—*Brassica pincea* var. foliosa (Florida broadleaf)
Red Root pigweed—*Amaranthus retroflexas*

Pretesting procedure (1) Two seed-soil mixtures are prepared as follows:

Mixture I: | Cc.
--- | ---
Rye grass seed | 196
Mustard seed | 75
Sifted, fairly dry soil | 18,000
Mixture II: |
Millet seed | 99
Amaranthus | 33
Sifted, fairly dry soil | 18,000

Each of above mixtures is rolled separately in 5 gallon containers for approximately one-half hour on ball mill to insure uniform mixing of seeds and soil.

(2) For each compound four 3-inch pots are filled with soil to within 1½ inches of top of pots. To 2 of these pots are added 70 cc. of Mixture I. To the remaining 2 pots are added 70 cc. of Mixture II. The seed-soil mixture is tamped firmly, and the pots are removed to greenhouse and watered lightly.

Application of toxicant.—About 2 hours after planting, 25 ml. of the test solution are added to each of 2 pots for each soil-seed mixture; i.e., one replicate of each seed mixture per concentration. An equal volume of a water solution containing acetone and an emulsifier in the same concentration as the herbicidal mixture but without the candidate herbicide is also added to each of the soil-seed mixtures. These pots are used as check or control units.

Concentration of toxicant.—The test compounds are formulated by a standard procedure of solution in acetone, addition of an emulsifier, and dilution with water. Preliminary tests are conducted at 1000 p.p.m. and 100 p.p.m.

Holding conditions.—The pots are held in the greenhouse and watered lightly until results are taken.

Indicative response.—Ten to twelve days after application of chemical, injury is noted for each species by comparing treated vs. untreated pots. Ratings are made according to the following designations:

5=no seedlings emerged
4=few seedlings emerged and/or very severe stunting
3=moderate reduction in stand and/or moderate stunting
2=very slight reduction in stand and/or slight stunting
1=no injury; seedlings appear no different with respect to stand or growth than untreated controls Stunting, burning, chlorosis, and hormone response are indicated by the appropriate notation:

*=stunting
*bu*=burning
*cl*=chlorosis
*lcu*=leaf curl
*fm*=formative effects

MITE FOLIAGE SPRAY AND SYSTEMIC TEST

Test organism.—Adults and nymphal stages of the two-spotted mite (*Tetranychus telarius* (L.)) reared on tendergeen beans under controlled conditions (80±5° F. and 50±5 percent relative humidity). Infested leaves from the stock culture are placed on the primary leaves of 2 bean plants 6–8 inches in height growing in a 2½ inch clay pot. A sufficient number of mites for testing (150–200) will transfer from the excised leaves to the fresh plants in a period of 24 hours. Following the 24-hour transfer period, the excised leaves are removed from the infested plants.

Application of toxicant.—Infested tendergreen bean plants of standard height and age are placed on a revolving turntable. A formulated water mixture of the chemical (100–110 ml.) is applied to the plants by use of a DeVilbiss spray gun with air pressure set at 40 pounds. Application of this volume of formulated compound takes 25 seconds. This volume of spray is sufficient to wet the plants to run-off. The potted plants are transferred to a 4 ounce paper container (Lily-Tulip Cup Corporation No. 143–BG), and 30 ml. of the formulated compound is poured into the pot. An equivalent amount of a water solution containing acetone and emulsifier in the same concentrations as the insecticidal mixture but without the candidate insecticide is applied to other plants as checks or controls for the experiment.

Concentration of toxicant.—The test compounds are formulated by a standard procedure of solution in acetone, addition of an emulsifier, and dilution with water. Primary spray applications are conducted at 1,000 p.p.m. (I) and systemic tests at 250 p.p.m. (II).

Holding conditions.—The treated plants are held at 80±5° F. and 50±5 percent relative humidity for a period of 7 days when mortality counts of motile forms (adults and nymphs) are made.

Indicative response.—Microscopic examination of motile forms is made on one leaf from each of the 2 test plants. Any individual which is capable of locomotion upon stimulation is considered living. Each compound is rated according to the following designations:

5=excellent control
3=fair control
1=poor control

MITE OVICIDE TEST

Test organism.—The egg of the two-spotted mite (*Tetranychus telarius* (L.)) obtained from adults reared on tendergreen beans under controlled conditions (80±5° F. and 50±5 percent relative humidity). Heavily infested leaves from the stock culture are placed on uninfested bean plants. Females are allowed to oviposit for a period of 24 hours, and the leaves of the plants are then dipped in an 800 p.p.m. solution of TEPP in order to kill the motile forms and prevent additional egg laying. TEPP does not affect the viability of the eggs.

Application of toxicant.—The plants are placed on a revolving turntable. A formulated water mixture of the chemical (100–110 ml.) is applied to the plants by use of a DeVilbiss spray gun with air pressure set at 40 pounds. Application of this volume of formulated compound takes 25 seconds. This volume of spray is sufficient to wet the plants to run-off. An equivalent amount of a water solution containing acetone and emulsifier in the same concentrations as the insecticidal mixture but without the candidate insecticide is also sprayed on the infested plants as a check or control.

Concentration of toxicant.—The test compounds are formulated by a standard procedure of solution in acetone, addition of an emulsifier, and dilution with water. Primary screening tests are conducted at 1,000 p.p.m.

Holding conditions.—The treated plants are held at 80±5° F. and 50±5 percent relative humidity for 7 days after which counts are made.

Indicative response.—Microscopic examination is made of the plant leaves, and the number of unhatched eggs (considered dead) and empty egg shells (living eggs) are noted. Each compound is rated according to the following designations:

5=excellent control
3=fair control
1=poor control

ARMYWORM SPRAY TEST

Test organism.—Larvae of the southern armyworm (*Prodenia eridania*, Cram.) reared on tendergreen beans in a room where temperature is held at 80±5° F. and relative humidity 50±5 percent.

Application of toxicant.—Potted tendergreen bean plants of standard height and age are placed on a revolving turntable. A formulated water mixture of the chemical (100–110 ml.) is applied to the plants by use of DeVilbiss spray gun with air pressure set at 40 pounds. Application of this volume of formulated compound takes 25 seconds. This volume of spray is sufficient to wet the plants to run-off. An equivalent amount of a water solution containing acetone and emulsifier in the same concentrations as the insecticidal mixture but without the candidate insecticide is sprayed on other plants as checks or controls for the experiment. When dry, paired leaves are separated, and each is placed in a 9 cm. Petri dish lined with filter paper. Four randomly selected larvae are introduced before closing the dish.

Concentration of toxicant.—The test compounds are formulated by a standard procedure of solution in acetone, addition of an emulsifier, and dilution with water. Primary screening tests are run at 1,000 p.p.m.

Holding conditions.—The closed dishes are held at 80–85° F. for 3 days. Although the larvae can easily consume the whole leaf within 24 hours, no more food is added. Check larvae remain vigorous during the entire holding period. The holding time cannot be reduced to less than 3 days without sacrificing ease of reading the percentage mortality.

Indicative response.—Larvae which are unable to move the length of the body (translocate), even upon stimulation, are considered dead. Possible repellent qualities of the test compounds are recorded as percentage feeding inhibition. While not excluding the possibility of contact insecticidal action, this test will indicate chemicals which display repellent or stomach poison effects in the absence of contact action. Each compound is rated according to the following rating designation:

5=excellent control
3=fair control
1=poor control

FLY BAIT TEST

Test organism.—Four to six day old adult house flies (*Musca domestica*, L.) reared according to the specifications of the Chemical Specialties Manufacturing Association [Blue Book (MacNair-Dorland Company, New York), pp. 243–244, 261, 1954] under controlled conditions of 80±5° F. and 50±5 percent relative humidity. The adult flies are immobilized by anesthetizing with $CO_2$. Twenty-five immobilized individuals (males and females) are then transferred to a cage consisting of a standard food strainer approximately 5 inches in diameter which is then inverted over the blotting paper containing the bait cup.

Application of toxicant.—A 10 ml. volume of the test formulation containing 1,000 p.p.m. of chemical in 10 percent sugar water is added to a souffle cup containing a one-inch square pad of adsorbent cotton. The cup containing the bait is centered on a sheet of white blotting paper measuring 6 by 6 inches and offered to the flies.

Concentration of toxicant.—The test compounds are formulated by a standard procedure of solution in acetone, addition of an emulsifier, and dilution with a 10 percent sugar solution. Primary screening tests are run at 1,000 p.p.m.

Holding conditions.—The caged flies are allowed to feed on the bait for a period of 24 hours. Room temperature and humidity are 80±5° F. and 50±5 percent relative humidity respectively.

Indicative response.—Flies which show no sign of movement upon stimulation are considered dead. Each compound is rated according to the following designations:

5=excellent control
3=fair control
1=poor control

The results of the tests for agricultural chemical activity were as follows:

| Example No.: | Agricultural chemical activity |
|---|---|
| 5–B | 5 on amaranthus (high rate) |
| 80 | 4 on bac. spot (spray appl.) |
| 73 | 3 on adult mite |
| 74 | 5 on armyworm |
| | 5 on fly bait |
| 84 | 4 on pythium |
| | 3 on fusarium |
| 60 | 3 on nematode (high rate) |
| 17 | 3 on mustard (high rate) |
| 2 | 3 on early blight |
| 13 | 5 on tomato suckering |
| 28 | 3 on adult mite |
| | 4 on millet (high rate) |
| 6 | 5 on nematode (high rate) |
| 15 | 3 on fusarium |
| 11 | 3 on mite egg |
| 4 | 2 on nematode (high and low rates) |
| 12 | 3 on mustard (high rate) |
| 69 | 5 on tomato suckering |
| 21 | 5 on armyworm |
| | 5 on fly bait |

TOTCYN's and TOTCYD's containing two or more active hydrogens (e.g., hydroxyl, amino, and carboxylic acid hydrogens) can be used to prepare useful polymers such as polyurethanes, polyesters, polyamides, epoxy resins, and the like, by known procedures. Such polymers have well known utility in the preparation of molded and cast articles, elastomers, coatings, foams, and the like. TOTCYN's and TOTCYD's containing tertiary amino groups can be used as catalysts for the production of urethane and epoxy polymers. TOTCYN's and TOTCYD's containing halogen can be used as flame retardant additives in many polymer systems. The TOTCYN's and TOTCYD's are also valuable intermediates for research chemists in synthesizing new compounds.

TOTCYN's and TOTCYD's that contain olefinic unsaturation can be copolymerized with vinyl monomers to form polymers having utility in the preparation of molded articles, coatings, films and sheets, and the like. The following two examples illustrate this utility:

EXAMPLE 114

A solution of 5.0 g. (.08 mole) vinyl chloride, 1.0 g. (.0044 mole) of 9-allyl-1,3,5,7-tetramethyl-TOTCYN, and 0.05 g. of azobisisobutyronitrile catalyst in 5.0 g. of toluene was charged to a Pyrex pressure tube and heated, with rocking agitation at 50° for a period of 64.25 hrs. The resulting resin was white, hard and of uniform appearance. After working up and drying, the polymer weighed 5.10 g. and contained 50.11% chlorine, by weight, corresponding to 88.2% (by weight) of vinyl chloride (11.8% TOTCYN). Molded plaques of the resin were clear and brittle and showed a reduced viscosity ($I_R$), in cyclohexane solution, of 0.29.

EXAMPLE 115

A solution of 5.0 g. (.08 mole) of vinyl chloride, 2.0 g. (.0088 mole) of 9-allyl-1,3,5,7-tetramethyl-TOTCYN, 0.05 g. of azobisisobutyronitrile and 5.0 g. of toluene was rocked and heated at 50° in a Pyrex reactor tube for a period of 64.25 hours. The resulting resin was worked up to give 4.55 g. of dry product which showe a reduced viscosity ($I_R$) of 0.29 in cyclohexane solution. The white, hard polymer product was found, by analysis, to contain 46.45% chlorine (81.8%, by weight of vinyl chloride) corresponding to 18.2 weight percent of contained TOTCYN.

What is claimed is:
1. A compound having the formula:

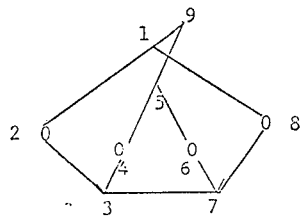

wherein positions 1 and 5 are substituted with alkyl of up to 8 carbon atoms and positions 3,7,9 and 10 are substituted with substituents selected from the group consisting of alkyl, alkenyl, alkynyl of up to 8 carbon atoms.

2. The compound of claim 1 wherein said compound is alkyl-substituted - 2,4,6,8 - tetraoxatricyclo[3.3.1.0$^{3,7}$]-nonane.

3. The compound of claim 1 wherein said compound is alkenyl-substituted - 2,4,6,8 - tetraoxatricyclo[3.3.1.0$^{3,7}$]-nonane.

4. The compound of claim 1 wherein said compound is alkynyl - substituted-2,4,6,8-tetraoxatricyclo[3.3.1.0$^{3,7}$]-nonane.

5. 9-allyl-2,4,6,8-tetraoxatricyclo[3.3.1.0$^{3,7}$]-nonane.

References Cited

Shapiro et al., "Jour. of Org. Chem.," vol. 31(8), 1966, pp. 2710–12.

Dolejs et al., "Collection Czech. Chem. Commun.," vol. 31(10), Eng., 1966, pp. 4187–9.

ALEX MAZEL, Primary Examiner

JAMES H. TURNIPSEED, Assistant Examiner

U.S. Cl. X.R.

71—75, 76, 77, 78; 260—2, 2.5, 45.8. 75, 77.5, 78, 247.1, 247.5, 247.7, 293.4, 294.3, 294.7, 294.8, 294.9